(12) United States Patent
Nago et al.

(10) Patent No.: US 6,567,117 B1
(45) Date of Patent: May 20, 2003

(54) METHOD FOR REGULATING IMAGE QUALITY, PICTURE COMMUNICATION EQUIPMENT USING SAME AND RECORDING MEDIUM HAVING RECORDED THEREIN A PROGRAM FOR EXECUTING THE METHOD

(75) Inventors: Hiroyuki Nago, Nagano (JP); Mineo Shoman, Yokohama (JP); Koji Fukuda, Yokosuka (JP); Hiroyuki Yamaguchi, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/392,736

(22) Filed: Sep. 9, 1999

(30) Foreign Application Priority Data

Sep. 9, 1998 (JP) .......................................... 10-254708
Sep. 25, 1998 (JP) .......................................... 10-271186

(51) Int. Cl.[7] .......................... H04N 17/02; H04N 7/12; H04N 7/01; H04N 11/02; H04N 11/04; H04N 11/20; H04N 5/46
(52) U.S. Cl. ...................... 348/180; 348/458; 348/459; 348/385.1; 348/419.1; 348/403.1; 348/558; 375/240.03
(58) Field of Search ................................. 348/180, 459, 348/458, 419.1, 403.1, 558, 553, 563, 569, 385.1, 389.1, 14.12, 14.13, 97; 386/109, 111–112, 27, 33; 375/240.03; 382/236

(56) References Cited

U.S. PATENT DOCUMENTS

| | | | |
|---|---|---|---|
| 5,115,309 A | * 5/1992 | Hang | 358/133 |
| 5,185,655 A | * 2/1993 | Wakeland | 358/13 |
| 5,526,054 A | * 6/1996 | Greenfield et al. | 348/467 |
| 5,675,379 A | * 10/1997 | Kato et al. | 348/97 |
| 5,703,646 A | * 12/1997 | Oda | 348/401 |
| 5,742,343 A | * 4/1998 | Haskell et al. | 348/415 |
| 5,757,421 A | * 5/1998 | Kato et al. | 348/97 |
| 5,920,359 A | * 7/1999 | Curley et al. | 348/699 |
| 6,049,570 A | * 4/2000 | Fukunaga et al. | 375/240 |
| 6,097,435 A | * 8/2000 | Stanger et al. | 348/387 |
| 6,188,792 B1 | * 2/2001 | Chujoh et al. | 382/236 |
| 6,343,098 B1 | * 1/2002 | Boyce | 375/240.03 |
| 6,347,117 B1 | * 2/2002 | Kato et al. | 375/240.5 |
| 6,356,589 B1 | * 3/2002 | Gebler et al. | 375/240.1 |
| 6,393,060 B1 | * 5/2002 | Jeong | 375/240.19 |

* cited by examiner

*Primary Examiner*—John Miller
*Assistant Examiner*—Paulos Natnael
(74) *Attorney, Agent, or Firm*—Connolly Bove Lodge & Hutz LLP

(57) ABSTRACT

In a regulation of a total image quality for an encoded picture, parameter conversion data which define applicable coding bit rates and coding frame rates for each image format are previously stored in a storage 13. An image quality regulating parameter is input through a parameter input section 11 and is used as a key in an image quality regulator 12 to make a reference to the parameter conversion data in the storage 13 in order to determine a coding frame rate and an image format. By delivering the coding frame rate and the image format to picture encoding means, a regulation of a total image quality is achieved through a single operation without independently operating two parameters, the image format and the frame rate.

21 Claims, 26 Drawing Sheets

FIG. 4     PRIOR ART

| PICTURE QUALITY / IMAGE FORMAT | MOTION ORIENTED | IMAGE QUALITY ORIENTED |
|---|---|---|
| CIF | Q 11 | Q 12 |
| QCIF | Q 21 | Q 22 |
| SQCIF | Q 31 | Q 32 |

FIG. 10

| QUALITY REGULATION PARAMETER / CODING PARAMETERS | MOTION ORIENTED ←——— Pq ———→ IMAGE QUALITY ORIENTED | | | | | | |
|---|---|---|---|---|---|---|---|
| IMAGE FORMAT | SQCIF | SQCIF | QCIF | QCIF | QCIF | CIF | CIF |
| CODING FRAME RATE fps | 13 | 11 | 9 | 7 | 5 | 3 | 1 |

FIG. 15

| CODING BIT RATE \ IMAGE QUALITY REGULATING PARAMETER / CODING PARAMETERS | | MOTION ORIENTED ←――― Pq ―――→ IMAGE QUALITY ORIENTED | | | | | |
|---|---|---|---|---|---|---|---|
| | | SQCIF | | QCIF | | CIF | |
| 32kbps | IMAGE FORMAT | SQCIF | | QCIF | | CIF | |
| | CODING FRAME RATE | 7 | 6 | 5 | 4 | 3 | 2 | 1 |
| 64kbps | IMAGE FORMAT | SQCIF | | QCIF | | CIF | |
| | CODING FRAME RATE | 13 | 11 | 9 | 7 | 5 | 3 | 1 |
| ... | IMAGE FORMAT | | | | | | |
| | CODING FRAME RATE | | | | | | |

| BIT RATE | REGION (FRAMES / SEC) | FORMAT |
|---|---|---|
| 32kbps | (a)  1 ~ 2.5 | CIF |
|  | (b)  2.5 ~ 4.5 | QCIF |
|  | (c)  4.5 ~ 7 | SQCIF |
| 64kbps | (a)  1 ~ 4 | CIF |
|  | (b)  4 ~ 8 | QCIF |
|  | (c)  8 ~ 13 | SQCIF |
| ⋮ | ⋮ | ⋮ |

FIG. 24

| PICTURE CODING PARAMETERS \ IMAGE QUALITY REGULATING PARAMETER | 7 | 6 | 5 | 4 | 3 | 2 | 1 |
|---|---|---|---|---|---|---|---|
| IMAGE FORMAT Fi | SQCIF | SQCIF | QCIF | QCIF | QCIF | CIF | CIF |
| CODING FORM RATE (FRAMES / SEC) Rb | 13 | 11 | 9 | 7 | 5 | 3 | 1 |

FIG. 28

| TYPE OF PICTURE INPUT UNIT | TYPE OF PROCESSOR | CODING PARAMETERS \ IMAGE QUALITY REGULATING PARAMETER | 7 | 6 | 5 | 4 | 3 | 2 | 1 |
|---|---|---|---|---|---|---|---|---|---|
| VIDEO CAPTURE BOARD/CARD | TYPE A | IMAGE FORMAT | SQCIF | SQCIF | QCIF | QCIF | QCIF | CIF | CIF |
| | | CODING FRAME RATE (FRAMES/SEC) | 13 | 11 | 9 | 7 | 4 | 2 | 1 |
| | TYPE B | IMAGE FORMAT | SQCIF | SQCIF | QCIF | QCIF | QCIF | CIF | CIF |
| | | CODING FRAME RATE (FRAMES/SEC) | 15 | 13 | 11 | 9 | 6 | 3 | 1 |
| | .... | IMAGE FORMAT | | | | | | | |
| | | CODING FRAME RATE (FRAMES/SEC) | | | | | | | |
| PARALLEL PORT CAMERA | TYPE A | IMAGE FORMAT | SQCIF | SQCIF | QCIF | QCIF | QCIF | QCIF | CIF |
| | | CODING FRAME RATE (FRAMES/SEC) | 6 | 5 | 4 | 3 | 3 | 2 | 1 |
| | TYPE B | IMAGE FORMAT | SQCIF | SQCIF | QCIF | QCIF | QCIF | CIF | CIF |
| | | CODING FRAME RATE (FRAMES/SEC) | 8 | 6 | 5 | 4 | 3 | 2 | 1 |
| | .... | IMAGE FORMAT | | | | | | | |
| | | CODING FRAME RATE (FRAMES/SEC) | | | | | | | |

← PROCESSING CAPABILITY : TYPE A < TYPE B < ....

METHOD FOR REGULATING IMAGE QUALITY, PICTURE COMMUNICATION EQUIPMENT USING SAME AND RECORDING MEDIUM HAVING RECORDED THEREIN A PROGRAM FOR EXECUTING THE METHOD

BACKGROUND OF THE INVENTION

The invention relates to a method and an apparatus for regulation of image quality in a picture coding which is used in a picture/voice communication as wall as in a picture filing through communication networks such as GSTN, ISDN, PHS, PDC or the like, a picture communication equipment and also relates to a recording medium having a program recorded thereon which carries out the method in a computer.

According to ITU-T, H. 263, for example, five image formats are defined including SQCIF, QCIF, CIF, 4CIF and 16CIF. Of these, the image formats SQCIF, QCIF and CIF, which are illustrated by images F1, F2 and F3 shown in FIGS. 1A, 1B and 1C, respectively, are used for picture transmission/reception in T.V telephone or conference system. SQCIF comprises 128×96 picture elements, QCIF comprises 176×144 picture elements and CIF comprises 352×288 picture elements. An amount of data per picture element which is used to denote a gradation is determined by a picture quality setting, which is separately required and which in turn determines whether a motion in the image or the definition is to predominate, thus eventually determining a coding frame rate. Assuming that the picture quality should be motion oriented (which is equivalent to choosing a high coding frame rate), the amount of data per picture element is suppressed low to degrade the image quality while improving the frame rate. By contrast, if the picture quality should be image quality oriented (which is equivalent to reducing the coding frame rate), the amount of data per picture element is increased to improve the image quality while the frame rate is degraded. Thus it has been necessary in the prior art for a user interface which regulates the image quality in the TV-telephone or conference system to provide a combination of both the image format and the picture quality of a picture being transmitted.

FIG. 2 illustrates an exemplary user interface which occurs on a conventional computer display screen. A user may depress either selection button D22 on a user interface screen D20 to change the image format or the picture quality. The term "picture quality" is used herein for the ease of understanding by a general reader, but actually refers to a coding frame rate. An active sign D21 allows an indication of which one of the image format and the picture quality is to be changed. By using the selection button D22 to cause the active sign D21 to be activated for the indication "image format" and by depressing either change button D23, a change in the image format is enabled. In response to the depression of the change button D23, a change to a desired image format such as CIF, QCIF, SQCIF or the like takes place, as shown by a format display D24. Similarly, an active sign may be activated for the picture quality by using the selection button D22, and the change button D23 may then be depressed to change the picture quality (or the coding frame rate). The depression of the change button D23 is effective to choose either "motion oriented", as indicated by a corresponding display D25, or "image quality oriented".

FIG. 3 shows a procedure of operating the conventional user interface. When a communication is initiated and it is determined at step S1 that it is desired to change the image format, such change takes place at step S2. When it is determined at step S3 that it is desired to change the picture quality (coding frame rate), such change takes place at step S4. When it is determined at step S5 that a total satisfactory picture quality as desired by a user has been achieved, the operation proceeds to a following processing procedure. Otherwise, the operation returns to a decision at step S1. Thus the regulation of the image quality in the user interface requires repeated procedures for combining the image format and the picture quality of a picture being transmitted.

A method of setting up an image quality to provide an animated picture so that a speaker in the TV-telephone appears to be behaving in a natural manner is known in the art, as disclosed in Japanese Laid-Open Patent Application No. 328, 341/1993, where coding parameters had to be changed depending on whether the amount of compacted data is greater or less than a given value. This technique is similar to a coding quantity control which is premised for a variety of picture coding schemes (H.261, H.262, H.263) which are chosen under consideration by the international standards organization ITU-T, and in its present form, requires at least two parameters, the image format and the frame rate, to be changed when a user regulates the image quality.

Thus it will be seen that with the prior art approach, before initiating a communication, a user has to operate the two parameter, the image format and the picture quality, in his user interface of a picture communication equipment in order to obtain the quality and the motion of the picture as desired by the user. At this end, in setting up the regulation of the total image quality for the picture, the user has to choose one of image qualities corresponding to values Q11, Q21, Q31, Q12, Q22 and Q32 as shown by a chart in FIG. 4 from combinations of the two parameters, the image format and the picture quality, requiring repeated procedures which demand a considerable amount of time and labor at the initiation of communication.

SUMMARY OF THE INVENTION

It is an object of the invention to provide a method of regulation of a total image quality in a coded picture which realizes the total image quality regulation through a single operation without requiring an independent operation of an image format and a frame rate, a picture communication equipment using the method, and a recording medium having recorded therein a program for executing the method.

According to a first aspect of the invention, a method of regulating an image quality of a picture by regulating coding parameters when the picture is coded in response to image quality regulating parameters comprises the steps of (a) previously storing characteristic information which defines an applicable range of coding frame rates for each image format in response to at least one, predetermined coding bit rate;

(b) inputting a parameter which specifies an image quality; and (c) determining the image format and the coding frame rate by reference to the characteristic information using the parameter as a key.

According to a second aspect of the invention, there is provided a method of regulating a picture coding according to the method according to the first aspect of the invention which comprises the steps of determining a coding time required to encode each image format, calculating a number of picture frames which can be used for each of the image formats on the basis of a result of the determination, and determining a picture format and a coding frame rate on the basis of a result of the calculation and image quality regulating parameters which are input.

BRIEF DESCRIPTION OF THE DRAWINGS

FIG. 4 is a chart showing various image qualities of a picture produced by the conventional user interface;

FIG. 10 is a chart showing an exemplary conversion table in a first embodiment of the invention;

FIG. 15 is a chart showing an example of parameter conversion data used in the second embodiment of the invention;

FIG. 24 is a chart showing an exemplary correspondence between image quality regulating parameters stored in a storage in the fifth embodiment;

FIG. 28 is a chart showing an exemplary correspondence between parameters stored in a storage in the sixth embodiment.

DETAILED DESCRIPTION OF PREFERRED EMBODIMENTS

Figure 1C:
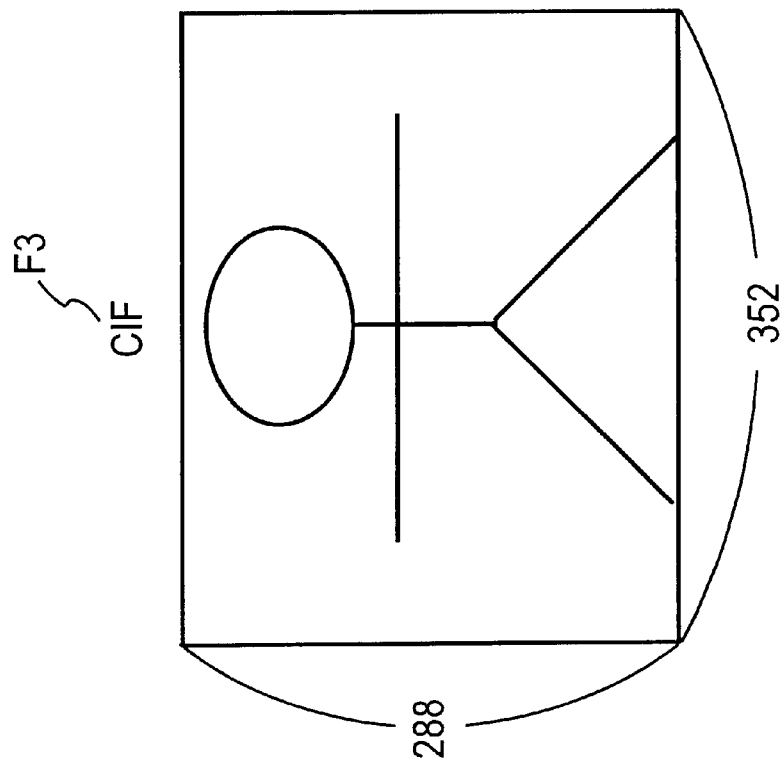
FIG. 1C is an illustration of an image format CIF.
Figure 1B:
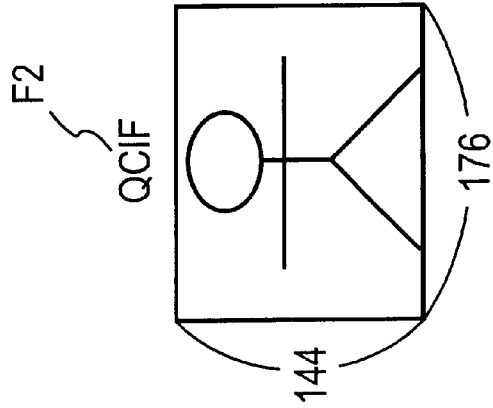
FIG. 1B is an illustration of an image format QCIF.
Figure 1A:
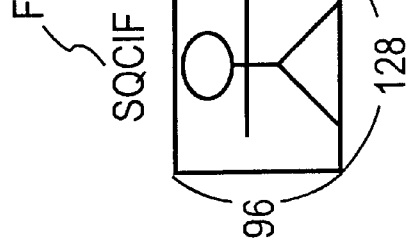
FIG. 1A is an illustration of an image format SQCIF.
Figure 2:
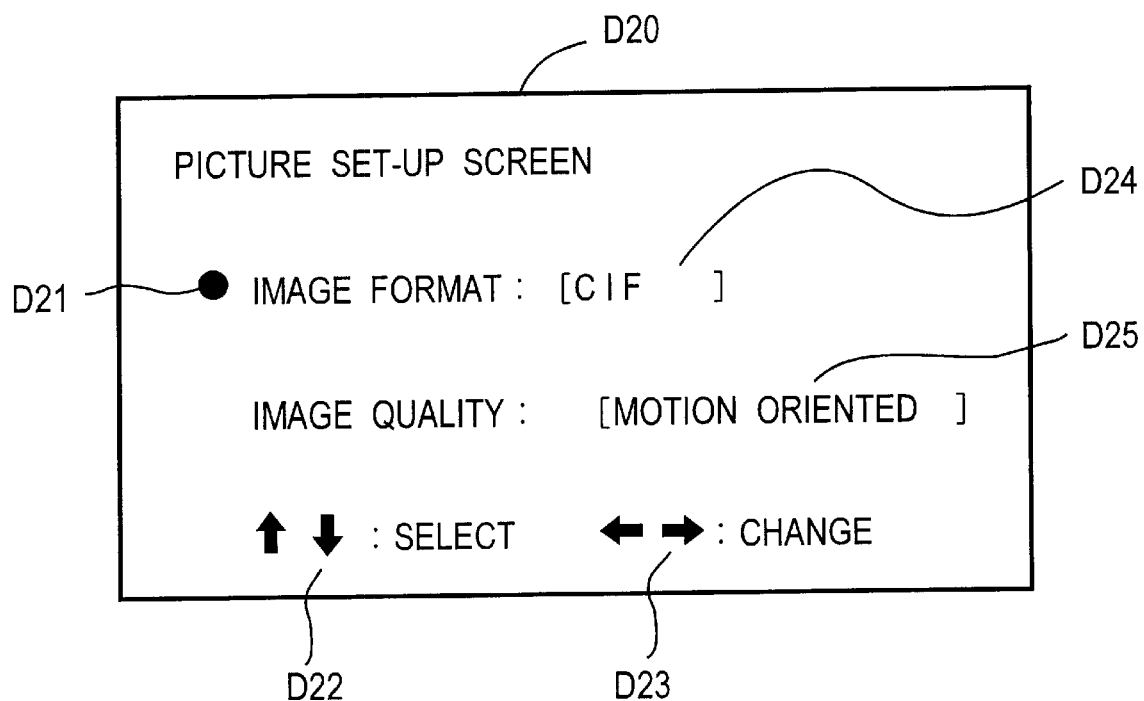
FIG. 2 is an illustration of a picture set-up screen with a conventional user interface.
Figure 3:
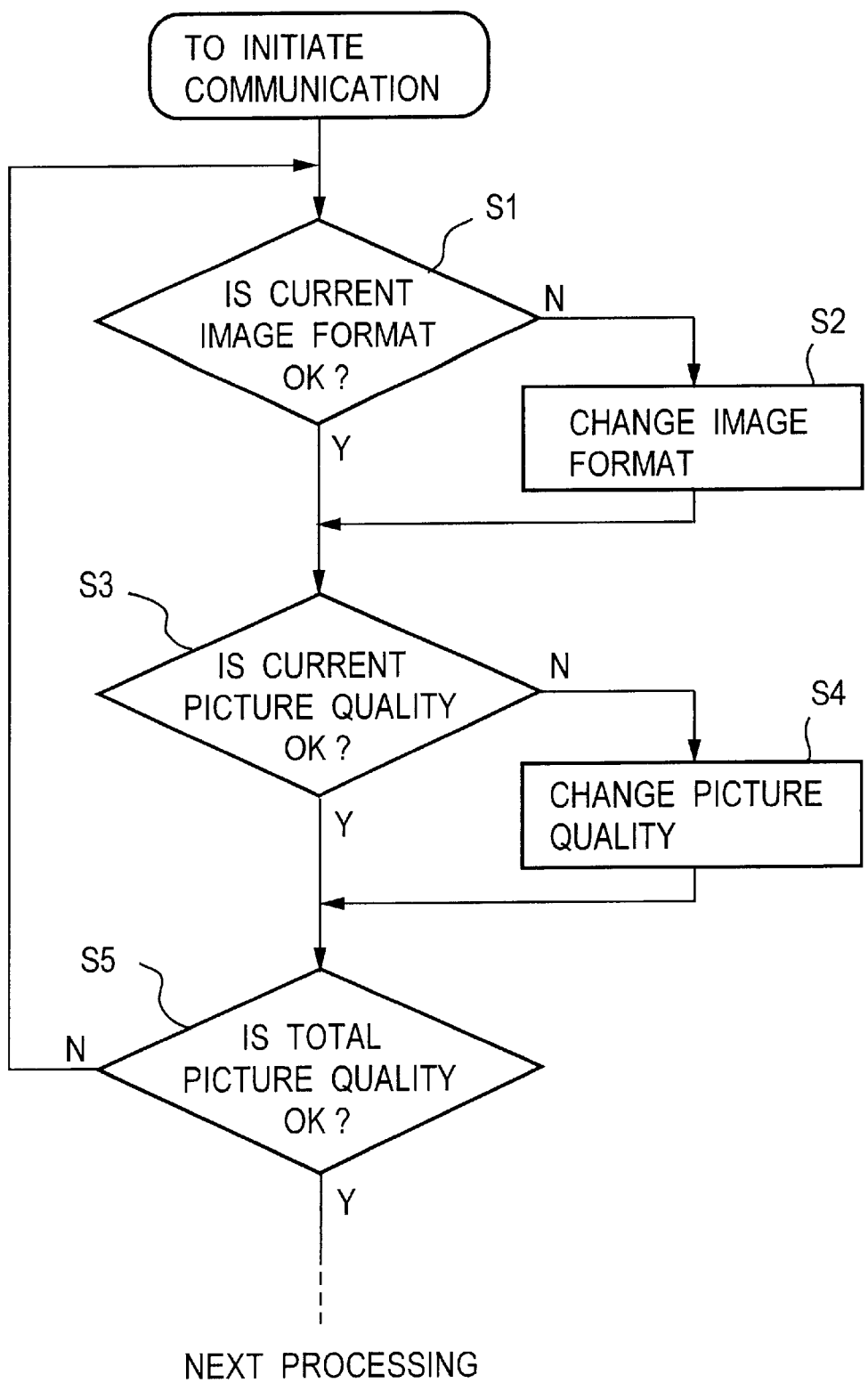
FIG. 3 is a flow chart illustrating a procedure of operating the conventional user interface.
Figure 5:
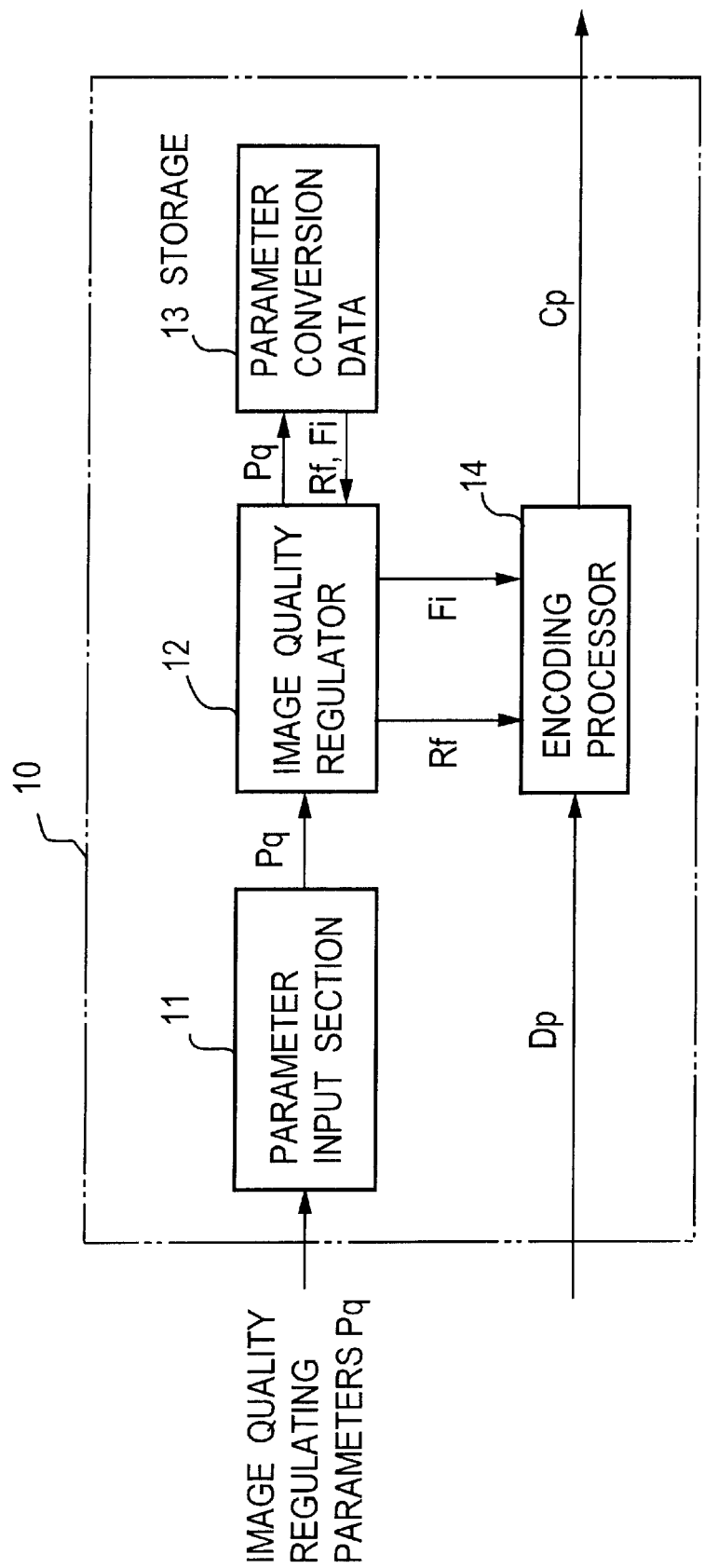
FIG. 5 is a schematic view showing the principle of the invention.
Figure 6:
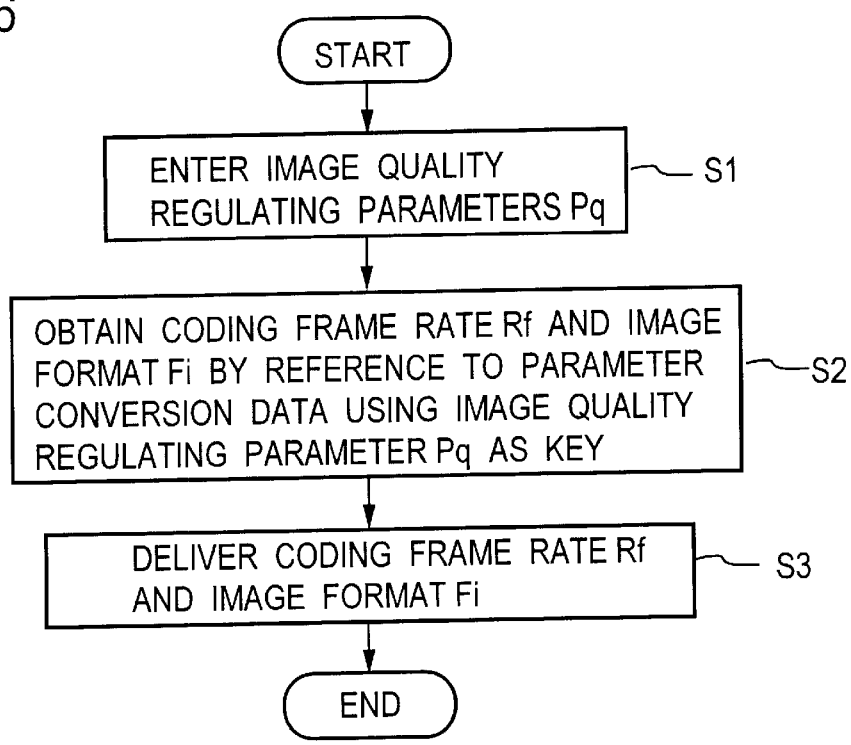
FIG. 6 is a flow chart illustrating the principle of the invention.

FIG. 5 illustrates the principle of a picture encoder 10 used in a picture communication equipment of the invention, and FIG. 6 is a flow chart of the operation thereof. In the present invention, characteristic information which defines an applicable range of coding bit rates and coding frame rates for each image format is previously stored as parameter conversion data in a storage 13. A parameter input section 11 includes a display which is capable of displaying a user interface screen, for example, and a keyboard and/or mouse which set up an input on the user interface screen. An operator enters an image quality regulating parameter Pq through the parameter input section 11 (step S1), determines a coding frame rate Rf and an image format Fi by reference to parameter conversion data stored in the storage 13, in the image quality regulating section 12, using the inputted image quality regulating parameter as a key (step S2), and applies them to a picture coding processor 14 to encode an input image data signal Dp in accordance with the image format Fi and the coding frame rate Rf thus determined and delivers the coded image signal Cp (step S3).

It is the most significant feature of the invention that in the image quality regulation of a picture communication equipment effecting a communication and a storage of the picture information, rather than individually setting up an image format and a coding frame rate, they are integrated into a single item to be set up which may be utilized by a user to achieve a total regulation of the image quality. As a consequence of this, while the image format and the coding frame rate must be independently operated and regulated in the conventional image quality regulation in an encoded picture, optimum image format and coding frame rate can be selected through the regulation of a single parameter in a user interface, representing whether the image quality or the motion is to predominate in accordance with the invention, thus allowing the total image quality regulation of the picture to be completed simply and in a brief time interval.

Several embodiments of the invention will now be described in detail below with reference to the drawings.

Figure 7:
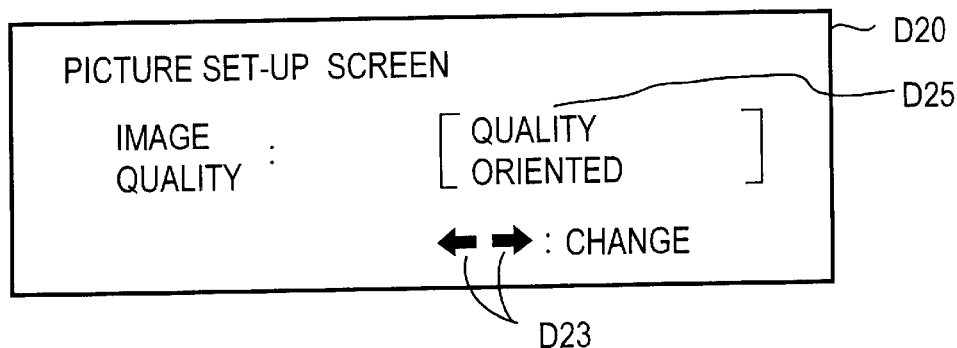
FIG. 7 is an illustration of a picture set-up screen with a user interface according to an embodiment of the invention.
Figure 8:
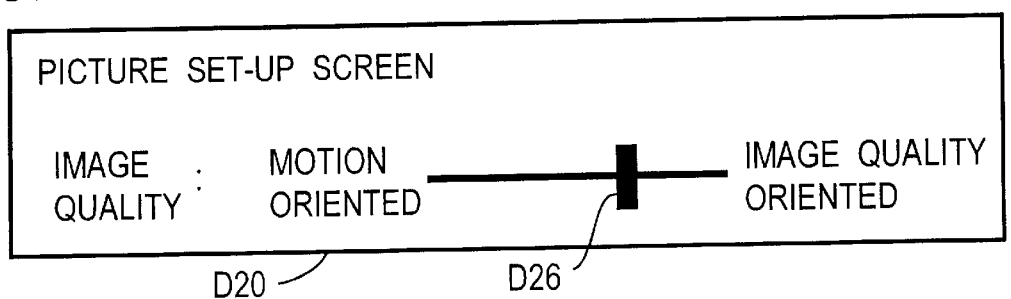
FIG. 8 is an illustration of a picture set-up screen with the user interface according to the embodiment of the invention.
Figure 9:
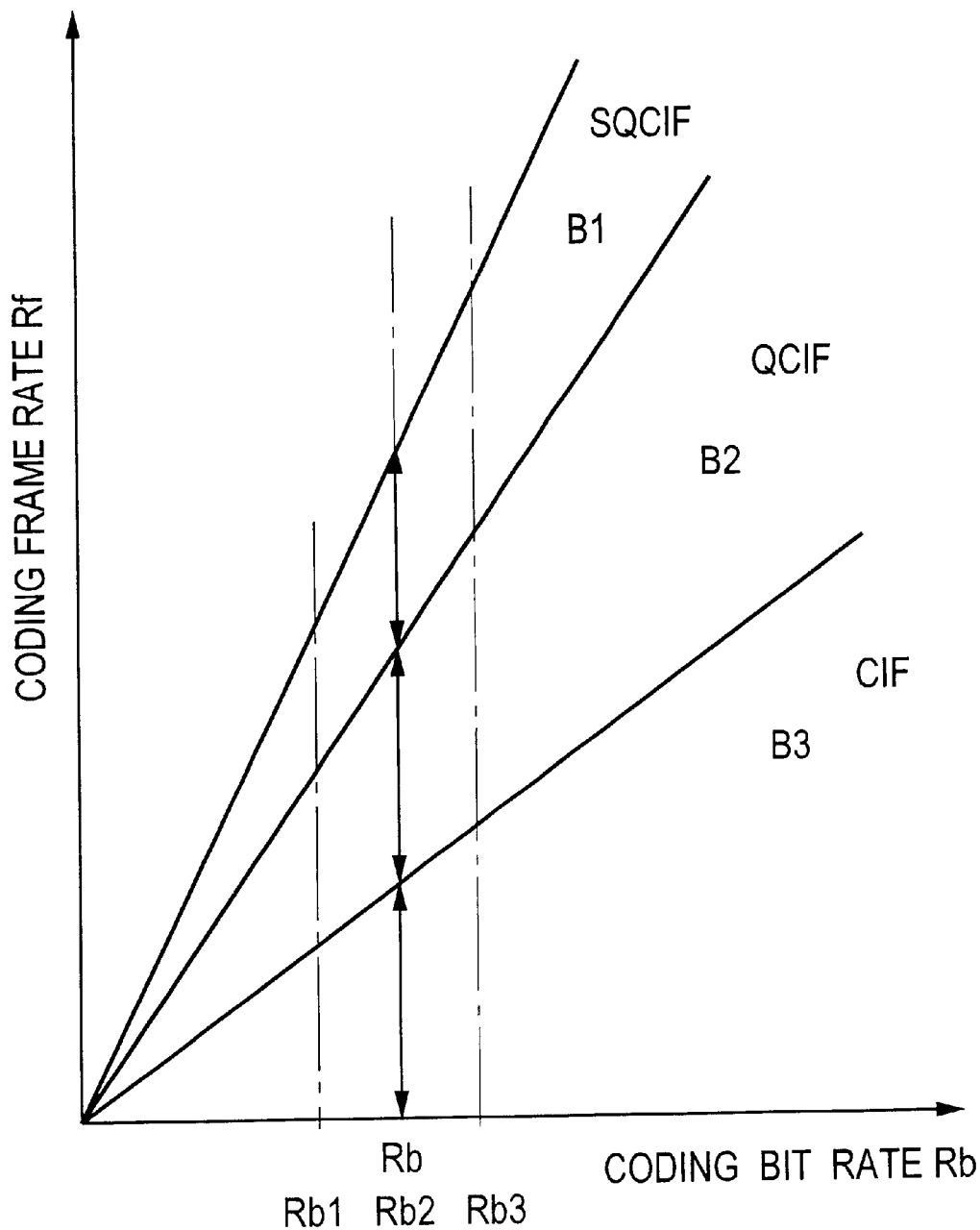
FIG. 9 is a diagram illustrating applicable ranges of image formats when the cording frame rate and the coding bit rate are selected in accordance with the embodiment of the invention.

FIGS. 7 and 8 show examples of set-up screens used in the embodiments of the method of regulating an image quality according to the invention, and FIG. 9 graphically shows a relationship between the coding parameter and the image quality which is found by the present inventors.

As shown in FIG. 7, in an embodiment of the invention, a user may utilize a change button D23 on a user interface screen D20 to choose one of items, "image quality", to be selected in setting up the image quality, to specify whether "quality oriented" or "motion oriented" is desired, whereby both the image format and the picture quality can be regulated. This allows the optimum image format which prevails at this point in time to be automatically determined, thus determining whether the motion or the definition of the image quality is to predominate. In the set-up of the image quality as illustrated in FIG. 7, it should be understood that rather than choosing an item, any desired numeral may be directly specified, whereupon the desired image quality of the picture can be instantaneously regulated in a more finely divided manner. While a set-up screen is shown in FIG. 7 which would be used when an encoding devoted hardware would be remotely controlled, for a personal computer capable of a window operation, a slider D26 as shown in FIG. 8 or a pull-down menu (not shown) may be used in the regulation of the image quality for improved maneuverability.

In the practice of the present invention, it has been necessary to clarify a relationship between the total image quality and values of the image format and the frame rate, or to provide a table relating the values of the image format and the frame rate to the image quality. Accordingly, the present inventors have prepared a variety of picture encoding data, which are then subject to an opinion test, leading to a finding of applicable ranges of various image formats as shown in FIG. 9. Specifically, an optimum region for the image format QCIF is band-shaped, ranging from a high frame rate and a high bit rate to a low frame rate and a low bit rate which is indicated at B2, a region Bi which exhibits a lower bit rate than the region B2 is an optimum region for image format SQCIF and a region B3 which exhibits a higher bit rate than the band-shaped region B2 is an optimum region for the image format CIF. Accordingly, a given value Rb for the coding bit rate which extends at an angle through the band-shaped region B2 may be suitably chosen to allow a high, a medium and a low zone may be determined for the coding frame rate, and the image format which is optimum for a particular zone may be determined as SQCIF, QCIF or CIF. In this manner, an optimum image format can be determined by merely examining to which one of these zones a given frame rate belongs.

A first embodiment of the invention will now be described.

FIG. 10 shows an exemplary conversion table in the first embodiment of the invention where the coding bit rate is fixed. In this example, the frame rate, representing the image quality, can be changed from 1 to 13 in seven steps. Where the motion oriented arrangement is of a primary importance, it follows that the image frame SQCIF and a coding frame rate of 13 would be chosen while where the image quality oriented arrangement is of a primary importance, the image format CIF and a coding frame rate of 1 would be chosen. It is only necessary that a user specifies one of the seven steps as the image quality, whereby the total regulation of the image quality is achieved without paying attention to the image format and the coding frame rate.

Figure 11:
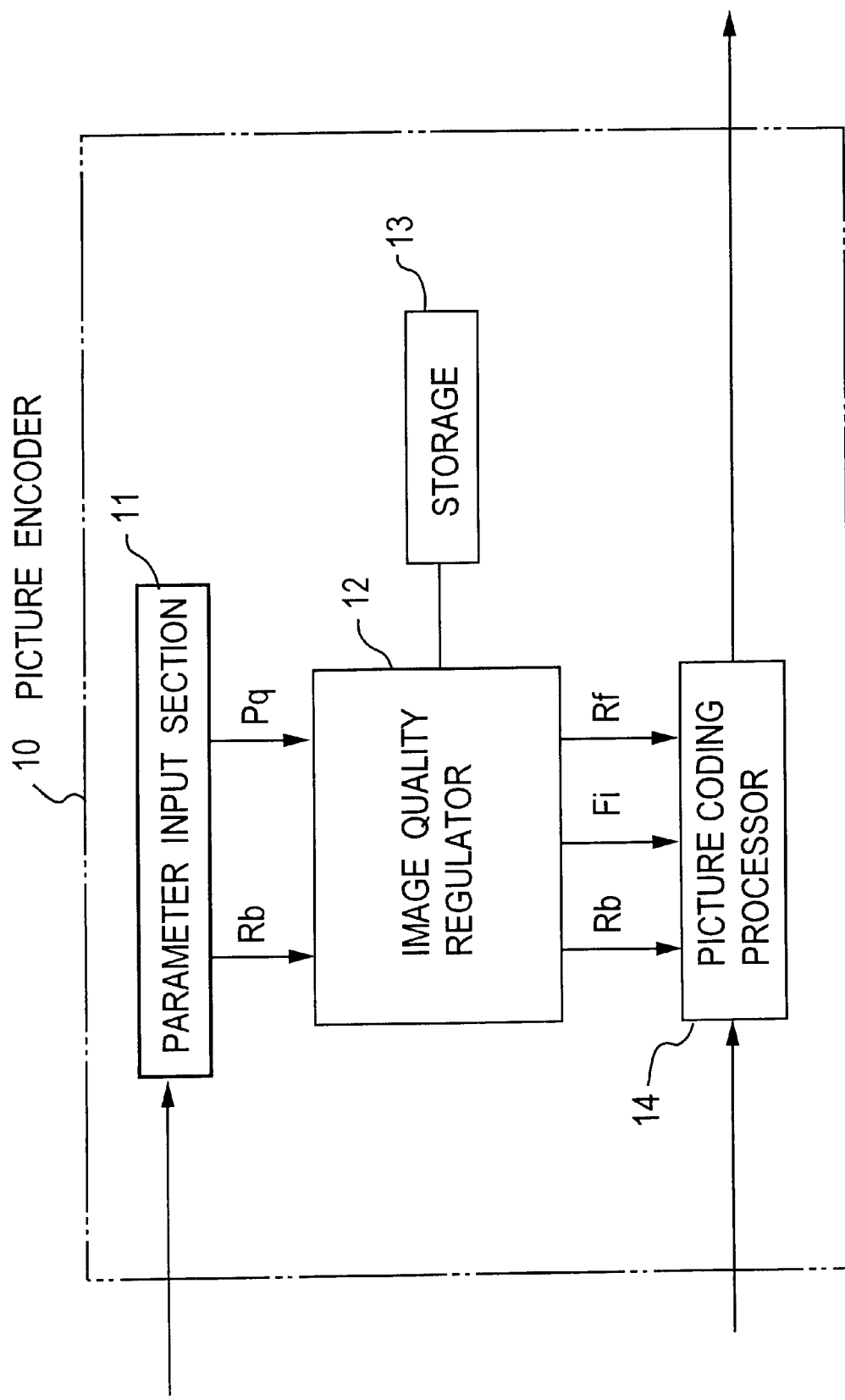
FIG. 11 is a schematic diagram of a picture encoder according to the first embodiment of the invention.

FIG. 11 shows an exemplary arrangement of a picture encoder 10 in the first embodiment of the invention, and the significance of the aforementioned conversion table can be more clearly described in connection with this arrangement.

Before the start of operation by the picture coding processor 14, an operator specifies a communication network and a transmission rate which are utilized. Alternatively, these may be set up during the manufacture of the encoder. In either instance, this fixedly determines the coding bit rate Rb in a manner as shown in FIG. 9, for example. The conversion table is formed so as to correspond to the fixed coding bit rate Rb which is determined in a manner mentioned above in connection with FIG. 9 so that the image format and the coding frame rate Rf can be determined in seven steps from the image quality regulating parameter Pq in a manner illustrated in FIG. 10, and is previously stored in a storage 13.

When the image quality regulating parameter Pq for the picture is supplied alone from the parameter input section 11 constructed as a GUI (graphical user interface) to an image quality regulator 12, the latter provides the image format Fi and the coding frame rate Rf by reference to the conversion table stored in the storage 13 using the image quality regulating parameter Pq as a key, and delivers the Rf, Fi produced and the coding bit rate Rb to a picture coding processor 14. In response to the image format Fi, the coding frame rate Rf and the coding bit rate Rb, the picture coding processor 14 applies a picture encoding operation upon the input picture with an image quality which is desired by the operator, thus delivering a coded picture Cp to the output of the processor 14.

Figure 12:
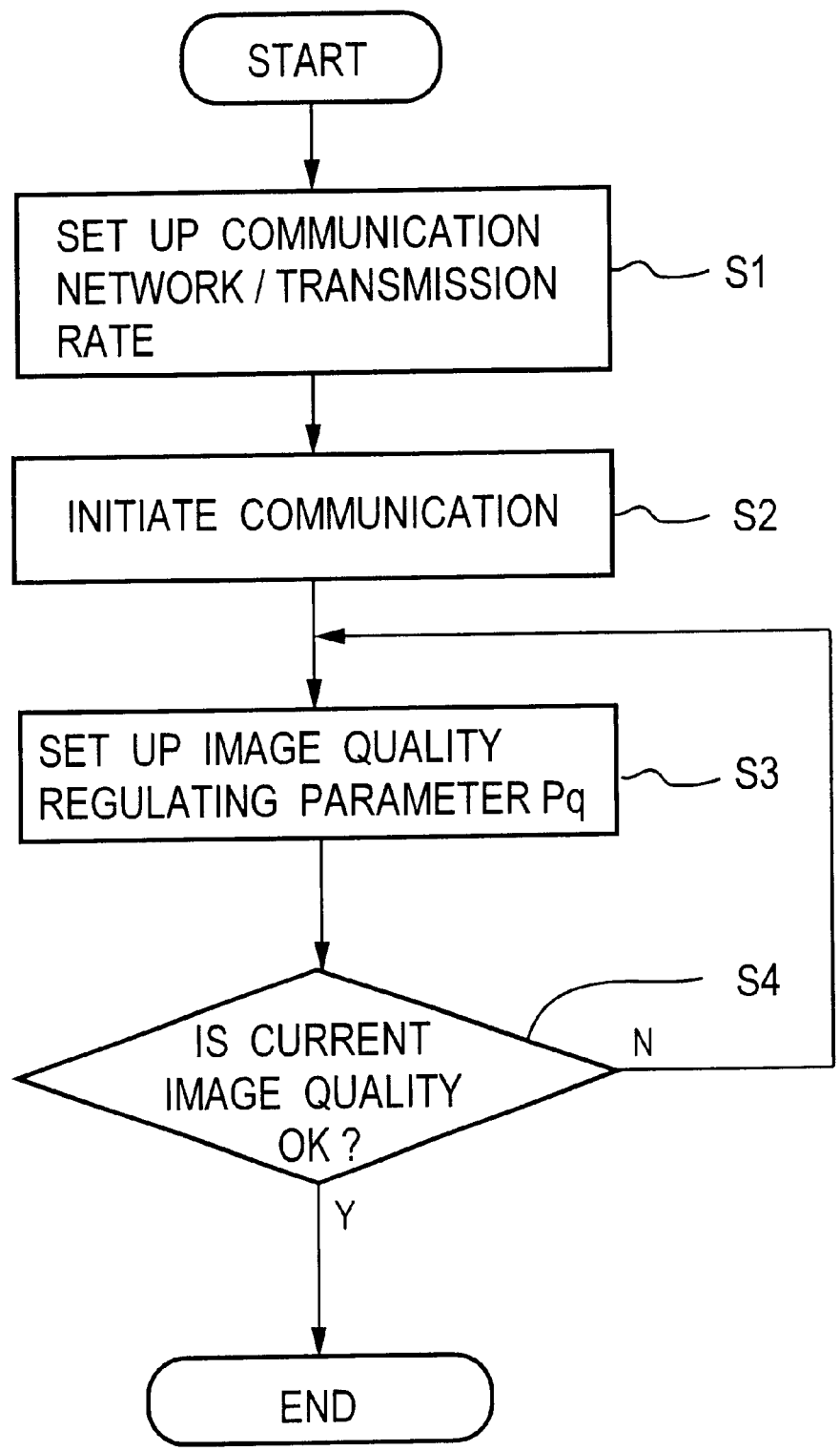
FIG. 12 is a flow chart illustrating a procedure of operations with the user interface according to the embodiment of the invention.

FIG. 12 shows a procedure of operations performed by a user in the present embodiment. Initially, a communication network/transmission rate which are utilized is set up (step S1). In the present embodiment, since it is premised that a coding bit rate Rb is fixed, it is possible that such set-up may be unnecessary (if the set-up takes place during the manufacture or a subsequent communication is contemplated). After the initiation of the communication (step S2), an entry takes place to set up or to change the image quality regulating parameter Pq (S3). A decision is rendered if the image quality of a picture is as desired (S4). If not, the operation ceases. Since the entry of the image quality regulating parameter Pq has achieved an optimum image quality which is desired for the picture, the regulation of the image quality can be performed more rapidly and exactly as compared with the prior art. If it is formed at step S4 that the image quality is not as desired, the operation returns to step S3 where the image quality regulating parameter Pq is changed.

A second embodiment of the invention will now be described. In the first embodiment, the coding bit rate is fixed to a single value. However, in the second embodiment, a predetermined plurality of coding bit rates as shown at RB1, RB2 and RB3 in FIG. 9 are selectable at the initiation of the communication.

Figure 13:
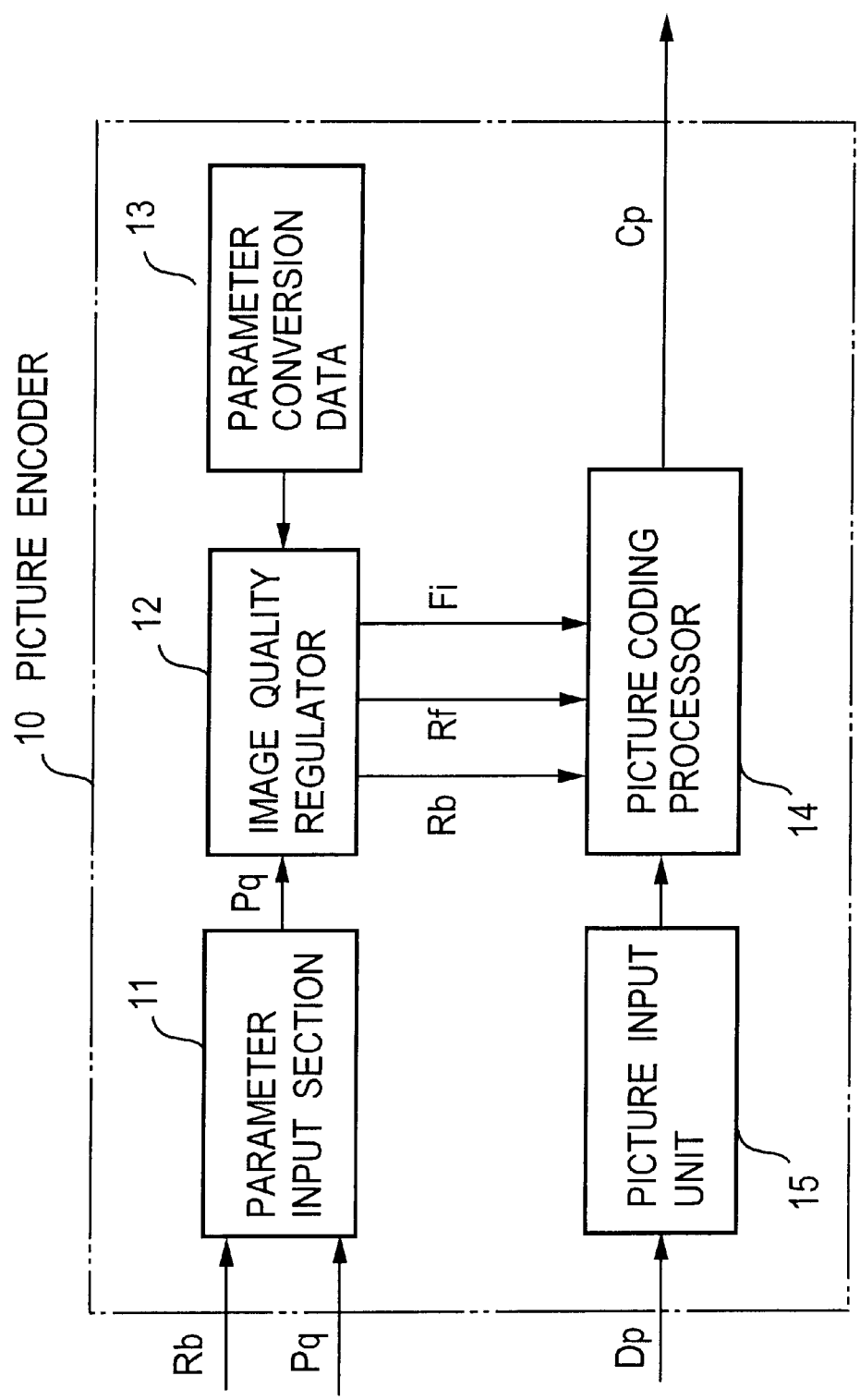
FIG. 13 is a schematic diagram of a picture encoder according to a second embodiment of the invention.
Figure 14:
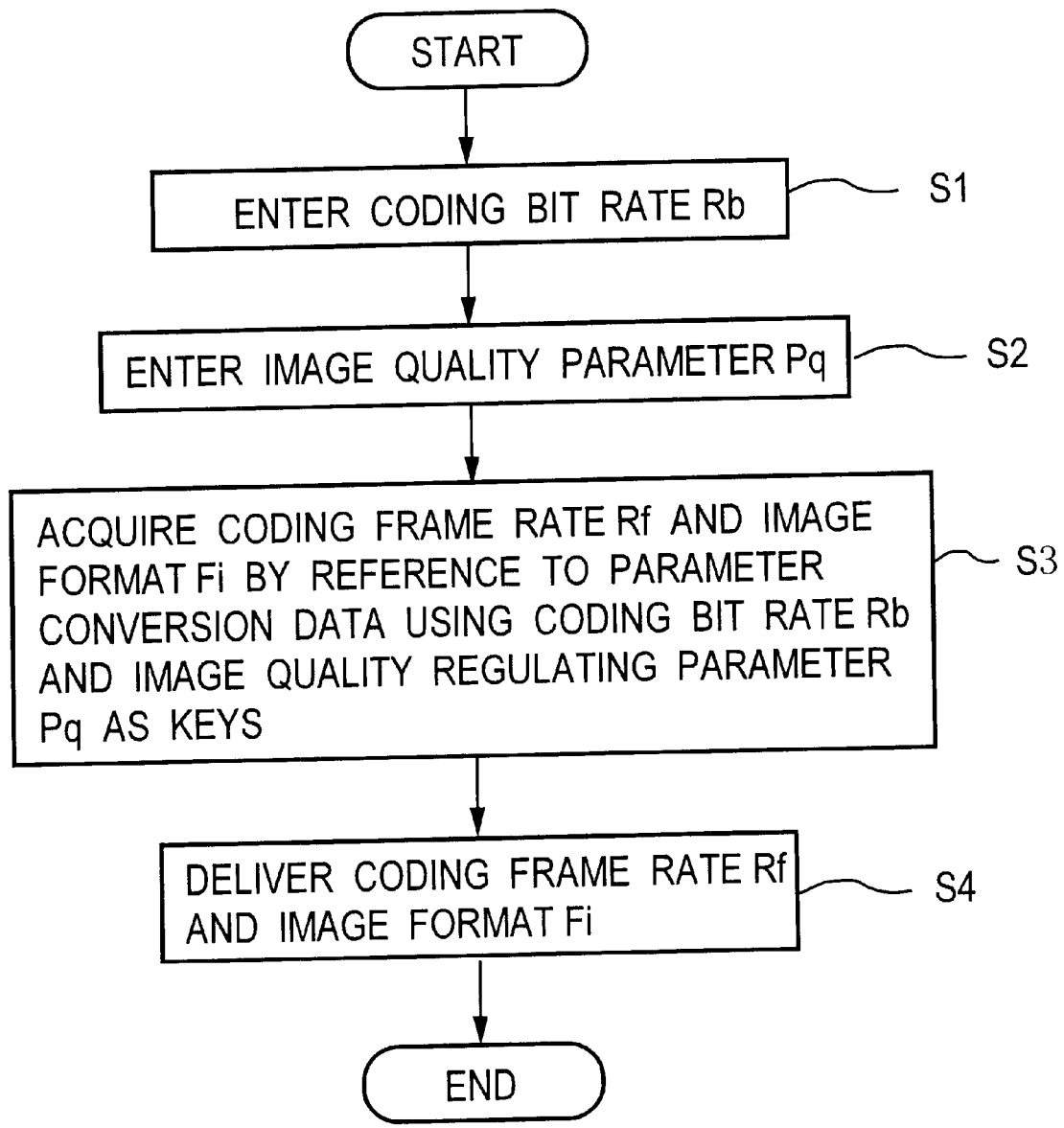
FIG. 14 is a flow chart illustrating an exemplary method of regulating the image quality with an exemplary operation of an image quality regulating sections in the second embodiment of the invention.

FIG. 13 is a schematic diagram of an exemplary arrangement of a picture encoder 10 according to the second embodiment. FIG. 14 is a flow chart of a method of regulating an image quality according to the present embodiment which conforms to an exemplary operation of an image quality regulator. FIG. 15 is a chart showing an exemplary arrangement of parameter conversion data used in the present embodiment.

Before initiating the communication, an operator sets up a communication network and a transmission rate which are utilized. This sets up the coding bit rate Rb (step S1). Alternatively, the coding bit rate Rb may be directly entered through a parameter input section 11. Parameter conversion data is formulated in accordance with the scheme illustrated in FIG. 9 for each of the coding bit rates RB1, RB2 . . . to define a table as shown in FIG. 15 which is previously stored in a storage 13. When an image quality regulating parameter Pq for the picture is supplied form the parameter input section 11 to an image quality regulator 12 (step S2), the latter is enabled to acquire an image format Fi and a coding frame rate Rf by reference to the parameter conversion data stored in the storage 13, which takes place by using the coding bit rate Rb and the image quality regulating parameter Pq as keys (step S3), and supplies the acquired Fi, Rf and the coding bit rate Rb to a picture coding processor 14 (step S4). In response to the image format Fi, the coding frame rate and the coding bit rate Rb, the picture coding processor 14 applies a picture encoding processing to a picture data which is input from a picture input unit 15, which may be such an image capture board or a digital camera, with an image quality which is desired by the operator, thus delivering the coded picture data Cp.

The procedure of operations by a user in the present embodiment remains the same as in FIG. 12. Initially, a communication network/a transmission rate are set up (step S1). After the initiation of the communication (step S2), an entry to set up or change the image quality regulating parameter is made (step S3). A decision is rendered if the image quality of the picture is as desired (step S4), and if so, the operation is terminated. If not, the operation returns to step S3. Since the desired optimum image quality is achieved for the picture at the time the entry of the image quality regulating parameter Pq takes place, the regulation of the image quality can take place more rapidly and exactly as compared to the prior art.

A third embodiment of the invention will now be described. In the second embodiment, the number of possible frame rates is equal to seven in the example shown in FIG. 15 for the selected bit rate, and accordingly, the frame rate can only assume predetermined discrete values such as 1, 3, 5, . . . for example (for the coding bit rate of 64 kbps), but in the third embodiment, the coding frame rate can be changed and set up consecutively.

Figure 16:
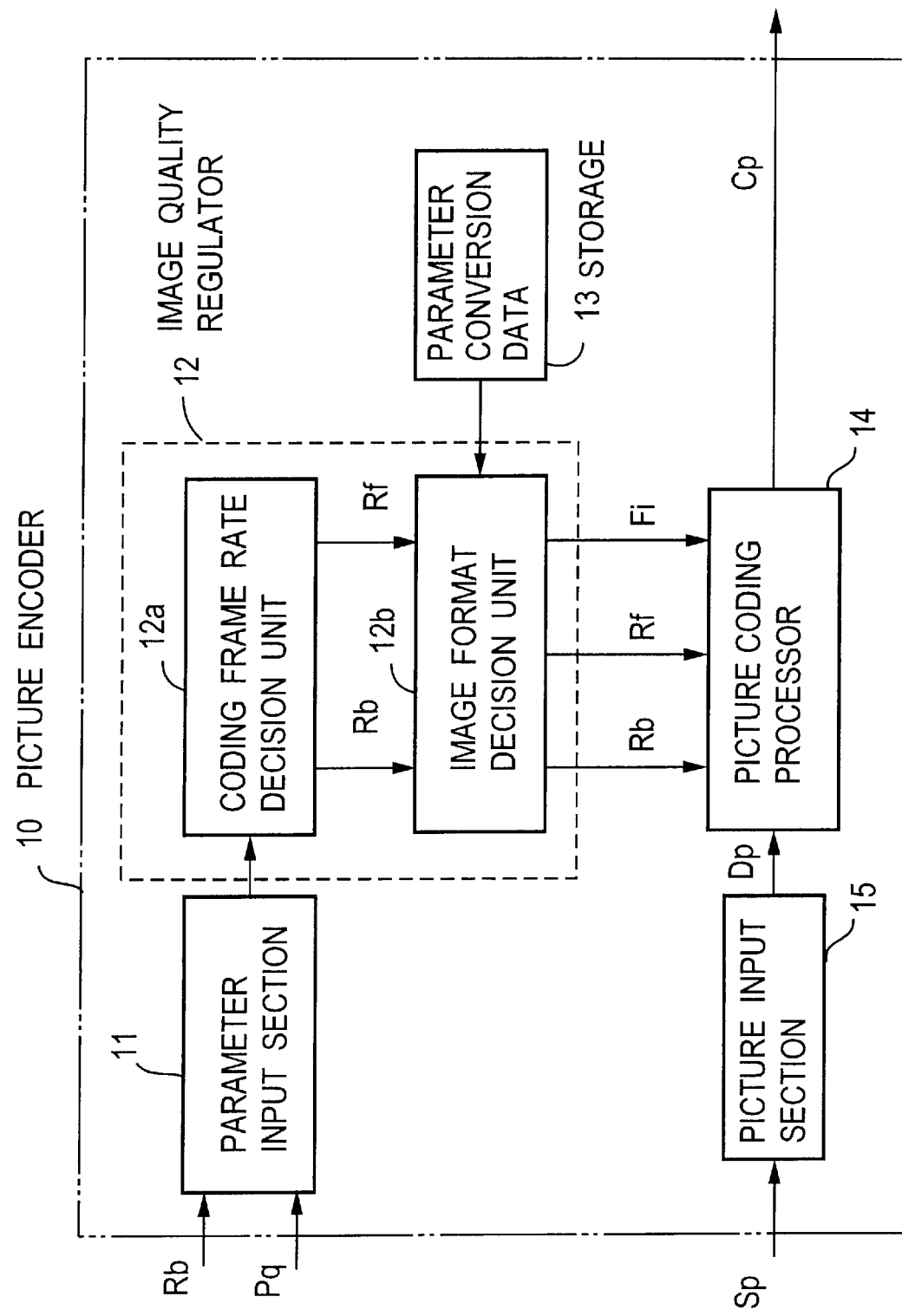
FIG. 16 is a schematic diagram of a picture encoder according to a third embodiment of the invention.
Figure 17:
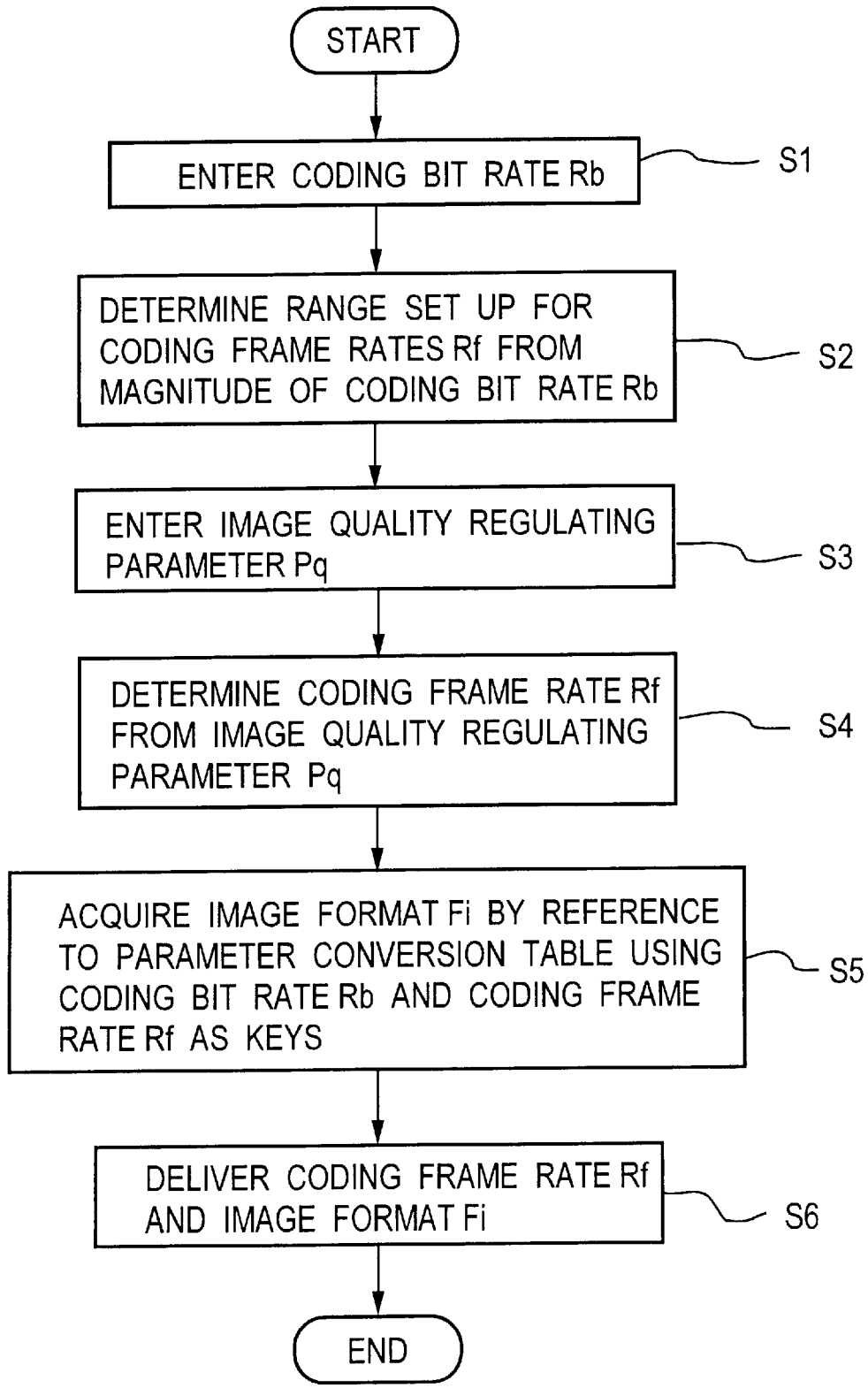
FIG. 17 is a flow chart showing an exemplary method of regulating the image quality in conjunction with an exemplary operation of an image quality regulating sections in the third embodiment of the invention.
Figures 18, 19:
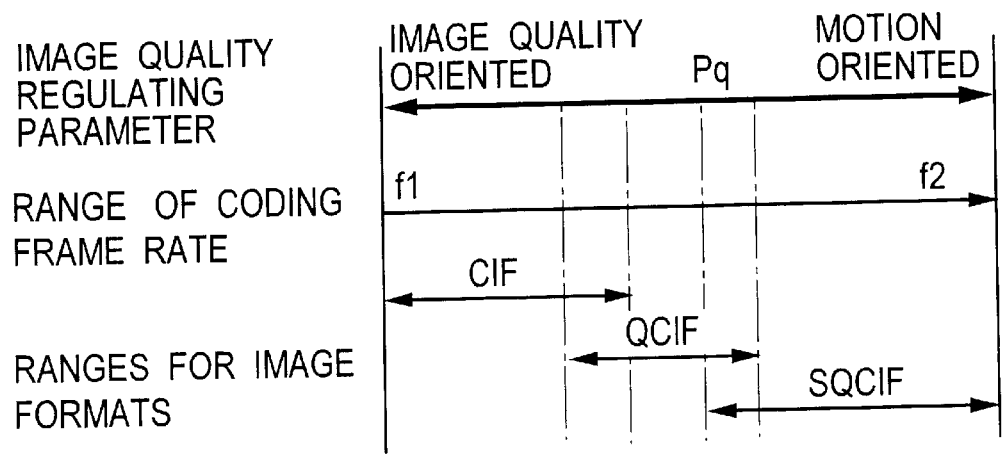
FIG. 18 is chart indicating a relationship between the coding frame rate and the applicable image format in the third embodiment of the invention.
FIG. 19 is a diagram of regions of the coding frame rate which are optimal to respective image formats as based on the subjective study.

FIG. 16 is a schematic diagram of an exemplary arrangement of a picture encoder 10 according to a third embodiment. FIG. 17 is a flow chart of the method of regulating an image quality according to the present embodiment which conforms to the exemplary operation of the image quality regulator. FIG. 18 is a chart showing a conversion table which represents a relationship between the coding frame rate Rf and applicable image formats Fi in the present embodiment.

The parameter conversion table is prepared on the basis of the scheme shown in FIG. 9 so that the ranges of coding frame rates Rf and the image formats Fi which are suitable for the respective ranges correspond to each of a plurality of coding bit rates Rb, in a manner as shown in FIG. 18, and is previously stored in a storage 13. As shown in the conversion table, a maximum range of operable frame rates for each coding bit rate is determined in a manner such that 1 to 7 frames/sec are available for the bit rate of 32 kbps and 1 to 13 frames/sec are available for the bit rate of 64 kbps. Each of these maximum ranges of operable frame rates are divided into three regions according to the scheme illustrated in FIG. 9 so that these regions are optimal to the respective image formats CIF, QCIF and SQCIF. In the present embodiment, when one of the coding bit rates is selected, an arrangement is made so that a corresponding maximum range of the frame rates Rf represents a maximum movable range for the slider D26 shown in FIG. 8, for example.

Before initiating the communication, an operator sets up a communication network and a transmission rate which are utilized. Alternatively, a coding bit rate Rb may be directly entered from a parameter input section 11. This sets up a coding bit rate (step S1). The operator then supplies an image quality regulating parameter Pq for the picture (which is the position of the slider D26 shown in FIG. 8) from the parameter input section 11 to the image quality regulator 12, whereupon a coding frame rate decision unit 12a of the image quality regulator 12 determines a maximum variable range (or the range of frame rates through which the lever D26 of the slider shown in FIG. 8 can be positioned) corresponding to the coding bit rate Rb (step S3). The coding frame rate is determined from the value of the image quality regulating parameter Pq which is set up by the operator (or user) (or the position of the slider lever shown in FIG. 8) (step S4). The image quality regulator 12 also includes an image format Fi decision unit 12b which determines an image format Fi from the coding frame rate Rf determined by the decision unit 12a and the coding bit rate Rb in accordance with the conversion table shown in FIG. 18 (step S5). The image format Fi thus obtained and the coding bit rate Rb and the coding frame rate Rf are supplied to a picture coding processor 14 (step S6). In response to the values of the image format, the coding frame rate and the coding bit rate, the processor 14 applies a picture coding processing upon the picture data Dp, which is input through a picture input unit 15, with an image quality which is desired by the operator, and delivers encoded picture data Cp.

Optimum regions determined for the three image formats CIF, QCIF and SQCIF based on the subjective evaluation illustrated in FIG. 9 are shown as delineated from each other by linear boundaries, but actual results of experiments conducted for the subjective evaluation show that these three regions have overlapping boundary areas, with consequence that the optimum regions for a given coding bit rate are as depicted in FIG. 19. Specifically, adjacent edges of the regions for CIF and QCIF overlap each other as do adjacent edges of the regions for QCIF and SQCIF. It then follows, if one were to rely on such results of experiments as indicated, that the requirement is satisfied by both image formats in their overlapping boundary area. Nevertheless, either one of the image formats must be selected for the input regulating parameter.

During the process of studying the optimum regions for the respective image formats on the basis of the opinion test illustrated in FIG. 9, a finding is reached. Where a plurality of image formats are applicable for an identical combination of the coding bit rate and the coding frame rate when preparing the parameter conversion data or when determining the image format, the selection of a greater one of the image formats, (for example, QCIF being preferred over SQCIF and CIF being preferred over QCIF) provides a higher image quality under the condition of an equal frame rate and an equal coding bit rate. Thus, relying on this finding, the selection of the image format for the overlapping boundary area as shown in FIG. 19 can be made by preferentialling selecting a greater one of the image formats. FIG. 18 is an example of a chart showing regions thus determined. Alternatively, it is also easily implementable to determine whether a larger image format or a smaller image format is to predominate depending on the range of the coding frame rates.

A procedure of operations to be followed by a user in the present embodiment remains the same as shown in FIG. 12. Initially, a communication network/transmission rate are set up (step S1). Subsequent to the initiation of a communication (step S2), an entry to set up or change the image quality regulating parameter takes place (step S3). A decision is rendered whether the image quality of the picture is as desired (step S4), and if so, the operation is terminated and otherwise, the operation returns to step S3. Since the desired optimum image quality is achieved in the picture at the time as the entry of the image quality regulating parameter takes place, the regulation of the image quality can take place more rapidly and exactly in comparison to the prior art.

At step S4 mentioned above, the operator selects a desired image quality while moving the slider lever D26 on the GUI. However, the image quality can be regulated by constructing a picture communication equipment so that the operator can regulate the image quality of the transmitted image while viewing a picture reproduced on a display by decoding the encoded picture signal in accordance with the coding frame rate which is determined in a manner corresponding to the prevailing slider position and the image format. An example thereof is shown in FIG. 20.

Figure 20:
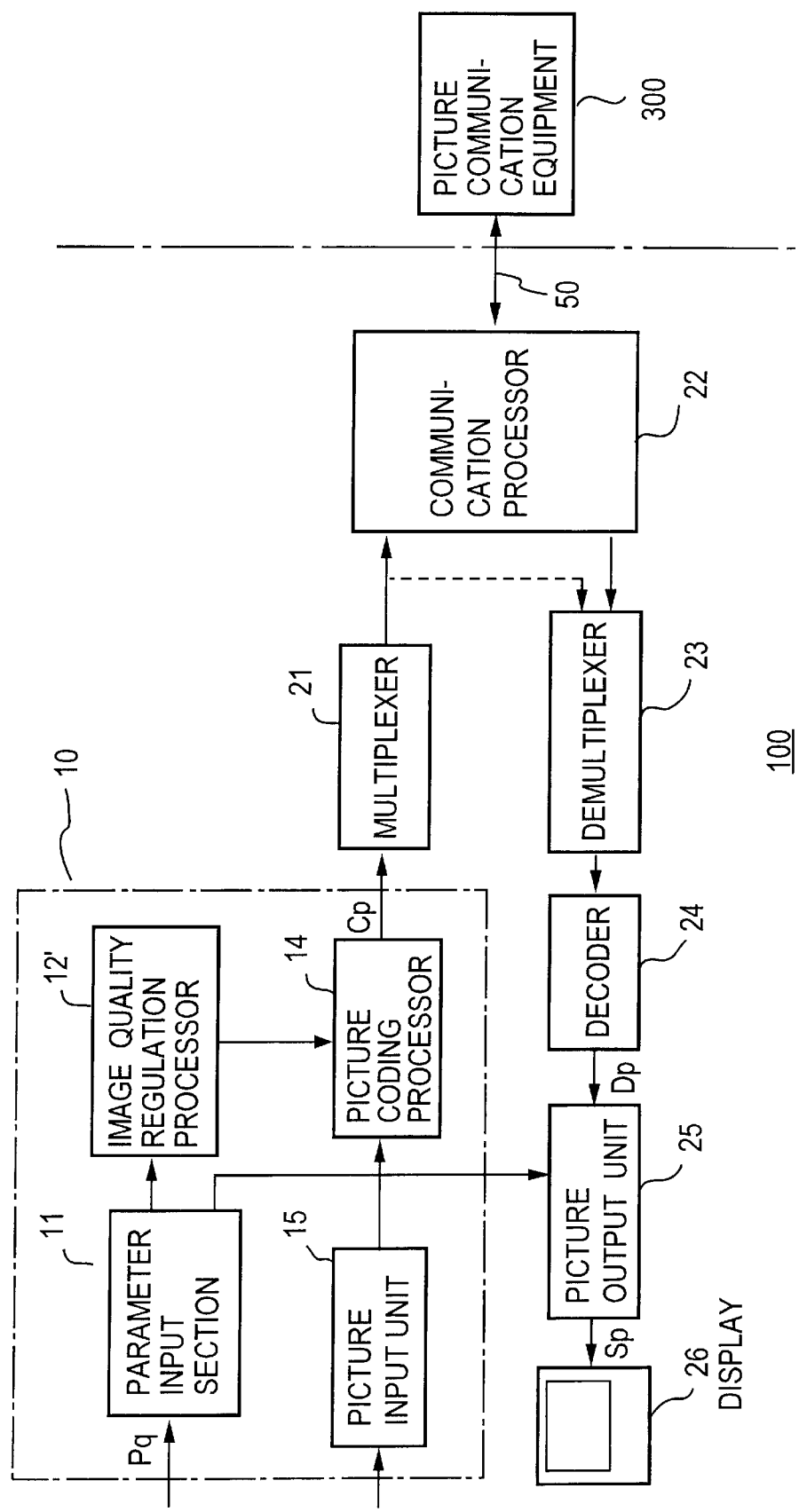
FIG. 20 is a schematic diagram of an exemplary picture communication equipment incorporating the picture encoder according to the invention.

A picture communication equipment 100 shown in FIG. 20 comprises a picture encoder 10, a multiplexer 21, a communication processor 22, a demultiplexer 23, a decoder 24 and a picture output unit 25, and a display 26. The picture encoder 10 can be any one of the preceding embodiments, and is shown as one representing the embodiment shown in FIG. 16 in its simplified form, it being understood that the storage 13 shown in FIG. 16 is contained in an image quality regulator 12'. An encoded picture data Cp comprising a plurality of encoding picture parameters produced by the picture encoder 10 is multiplexed in the multiplexer 21 (or is multiplexed together with coding voice parameter, if required), converted into a transmission data by the communication processor 22, and is transmitted to another picture communication equipment 300 through a channel 50. The picture communication equipment 300 is constructed in the same manner as the picture communication equipment 100. Transmitted data from the picture communication equipment 300 is converted into multiplexed data in the communication processor 22, and is demultiplexed into encoded picture data Dp by the demultiplexer 23. The encoded picture data is decoded by the decoder 24 to provide picture data, which is then converted into a picture data signal Sp by the picture output unit 25 to be displayed by the display 26.

In the picture communication equipment shown in FIG. 20, when the operator of the equipment 100 regulates the image quality of a picture transmitted from this equipment within the picture encoder 10 according to the invention, multiplexed encoded picture data which is applied to the communication processor 22 may also be applied to the demultiplexer 23, as indicated in broken lines, thus reproducing the transmitted data within the demultiplexer and the decoder 24 within the picture communication equipment 100 and feeding it through the picture output unit 25 to the display 26 to be displayed thereon. The operator may regulate the image quality while monitoring the displayed picture.

Alternatively, the operator of the picture communication equipment 300 may transmit an image quality regulating parameter indicated by information representing a slider position and produced by a parameter input section (not shown) within the picture encoder of the picture communication equipment 300 to the picture communication equipment 100, while the picture communication equipment 100 may apply the received position information to the image quality regulator 12' to control the image quality (the frame rate and the image format) of the transmitted picture before transmitting it, and the operator of the picture communication equipment 300 may regulate the slider position while viewing the received picture, thus controlling the position information which is being transmitted.

It should be understood that the embodiments shown in FIGS. 5, 11, 13 and 16 may be partially or entirely implemented by a computer or steps in the flow charts shown in FIGS. 6, 14 and 17 may be executed by a computer. A program which causes the computer to implement the functions of the embodiments or a program which causes the computer to execute the steps in the flow charts may be recorded on a recording medium which is readable by the computer such as FD (floppy disc), MO (magneto-optical disk), ROM, a memory card, CD, DVD (digital video disk), a removable disc or the like and offered for distribution.

When the maximum transmission bit rate of a communication system is fixed, if the picture quality is motion oriented (which is equivalent to increasing the coding frame rate), the amount of data per picture element is suppressed to degrade the image quality while improving the frame rate. On the other hand, when the picture quality is image quality oriented (which is equivalent to reducing the coding frame rate), the amount of data per picture element increases to improve the image quality while degrading the frame rate. In this manner, in the conventional method of regulating the image quality in TV-telephone or conference system, a user himself specifies the image format and the picture quality of a picture being transmitted.

In an ordinary picture communication equipment, the coding frame rate is generally selectable in a range from 1 to 30 frames/sec. When the user desires to transmit an image of a higher definition to a communicating peer entity, the coding frame rate which is close to a value of 1 frame/sec is chosen (thus retarding a motion). Conversely, when it is desired to transmit an image of a higher motion fidelity, the coding frame rate is brought closer to a value of 30 frames/sec (while losing the definition).

However, in actuality, when a maximum value of the coding frame rate which is 30 frames/sec is specified to a communicating peer entity in a picture encoding software, the coding frame rate may be suppressed by a limitation such as the processing capability of a picture communication equipment itself or the processing capability of a picture capturing device, and the actual coding frame rate may not reach the desired coding frame rate or a limit on the processing capability of the picture encoding software itself may fail to realize the specified coding frame rate. By way of example, when a frame rate of 15 frames/sec is specified, the maximum frame rate that can be actually achieved may be limited to 13 frames/sec because the processing capability of the picture communication equipment is limited to 13 frames/sec despite the processing capability of the picture encoding software permits up to 20 frames/sec. By way of another example, when a coding frame rate of 15 frames/sec is specified, a maximum coding rate may be limited to 13 frames/sec as a result of the limited processing capability of the picture encoding software to 13 frames/sec, despite the processing capability of the picture communication equipment allows for up to 20 frames/sec.

Accordingly, when the coding frame rate is sequentially increased, the attempt to upgrade the current rate of motion may fail to provide a faster motion because of the limit on the picture communication equipment or the picture encoding software which is reached at the current frame rate or at a less frame rate. Thus, such failure to achieve a faster motion allows an estimation that the limit prevents a fast motion from being achieved. In another instance, an increase in the frame rate may successfully produce a faster motion, but when it is desired to obtain a faster motion, the frame rate must be set up again to determine if the motion in the picture is actually faster. In other words, in order to gain a knowledge of the coding frame rate of a picture which is being actually transmitted for each image format such as CIF, QCIF or SQCIF on a picture communication equipment, it is necessary that a user must sequentially increase the coding frame rate beginning from a minimum value of 1 and examine the highest coding frame rate which is available for each image format.

In the foregoing description, it is assumed that a picture encoding software is loaded on a picture communication equipment to effect a picture encoding operation in order to simplify the description. However, it should be understood that the term "picture communication equipment" does not refer to only a devoted equipment or unit (hardware). The picture communication equipment may comprise a general purpose personal computer, but it should be understood that a general purpose personal computer includes a central processing unit (CPU), the processing capability of which varies from model to model.

If different picture communication equipments (inclusive of a use of a general purpose personal computer) are used to run an identical picture encoding software, there may result a discrepancy between the processing capability of the picture encoding software and processing capability of the picture communication equipment, resulting in the need to provide a similar accommodation as mentioned above.

It will then be seen that because it can not be said on what kind of picture communication equipment a picture encoding software is loaded, it is possible that if the software is loaded on a low rate picture communication equipment, a coding parameter which exceeds the processing capability of the picture communication equipment may be specified. In such instance, a desired picture quality can not be achieved in practice. Alternatively, the calculating and processing resources of a picture communication equipment may be entirely used for the purpose of the picture encoding operation to prevent a smooth execution of other calculations and processings which should concurrently take place for the same picture communication, producing a trouble that the voice may be interrupted from time to time as a result of a failure of a concurrent voice coding operation.

In the conventional picture encoding approach, the picture quality (coding frame rate) could have been chosen up to a maximum value of 30 frames/sec for each image format theoretically. However, because the competence is unknown for the processing capability of a picture communication equipment on which the picture encoding software is run, there results a discrepancy between the processing capability of the picture encoding software and the processing capability of the picture communication equipment, resulting in a failure to provide a desired picture quality. In addition, a smooth execution of other calculations and/or processings which are to be run on the picture communication equipment may be prevented. With respect to the latter, when a voice coding processing is concurrently run, the processing can only be executed intermittently to cause interruptions in the voice, presenting a serious problem that a concurrent communication of picture/voice is actually prevented.

For this reason, a user had to examine if a certain encoding software can be used on a certain picture communication equipment to transmit an image containing a motion and to ascertain the speed of motion in the image which the combination can successfully transmit, by recognizing a limit for each of the image formats such as CIF, QCIF or SQCIF beforehand while incrementing the coding frame rate.

A fourth embodiment of the invention which will be described below is intended to improve the previous embodiments in a manner to overcome such problems.

Figure 21:
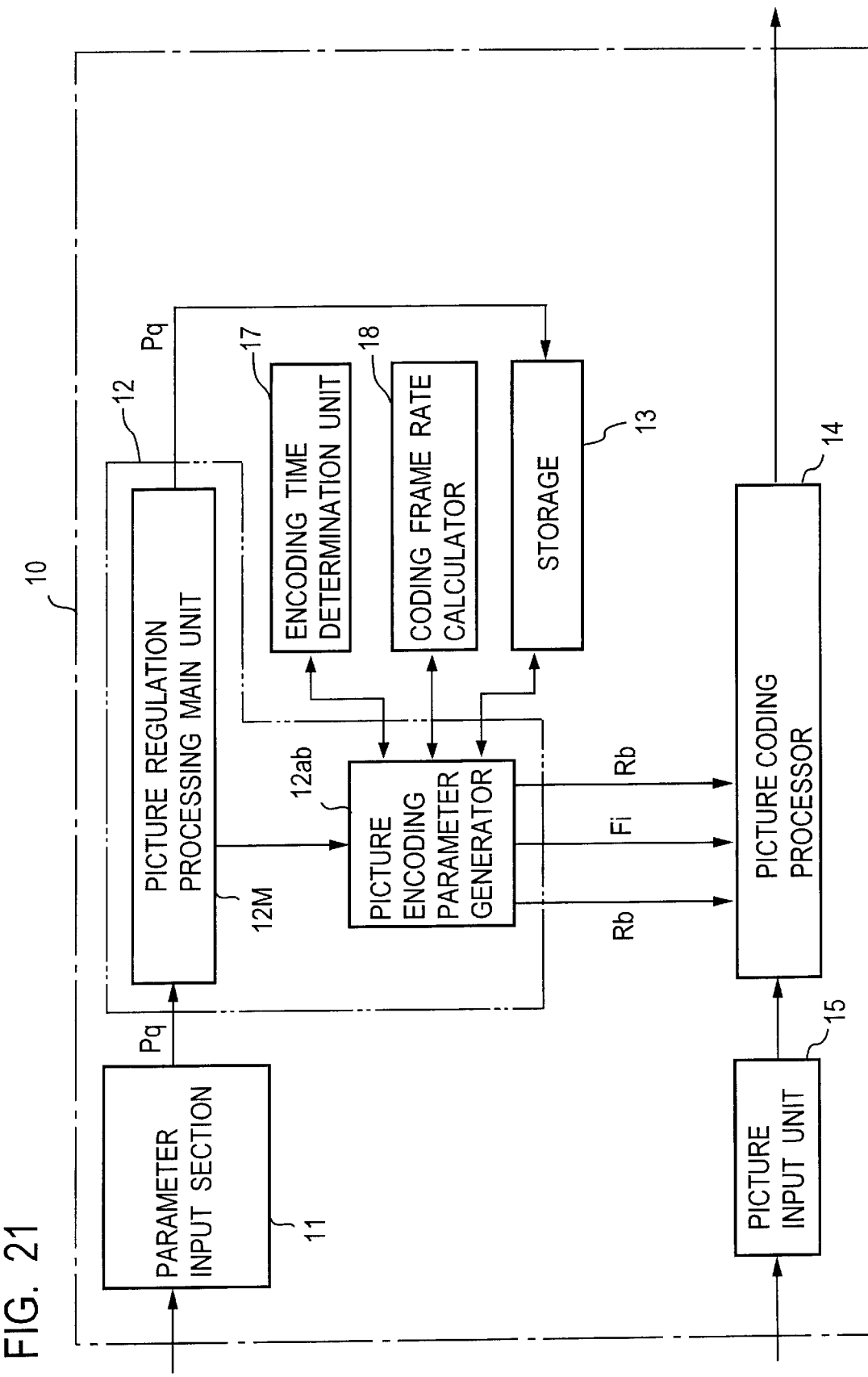
FIG. 21 is a schematic diagram of a fifth embodiment of the picture encoder according to the invention.
Figure 22:
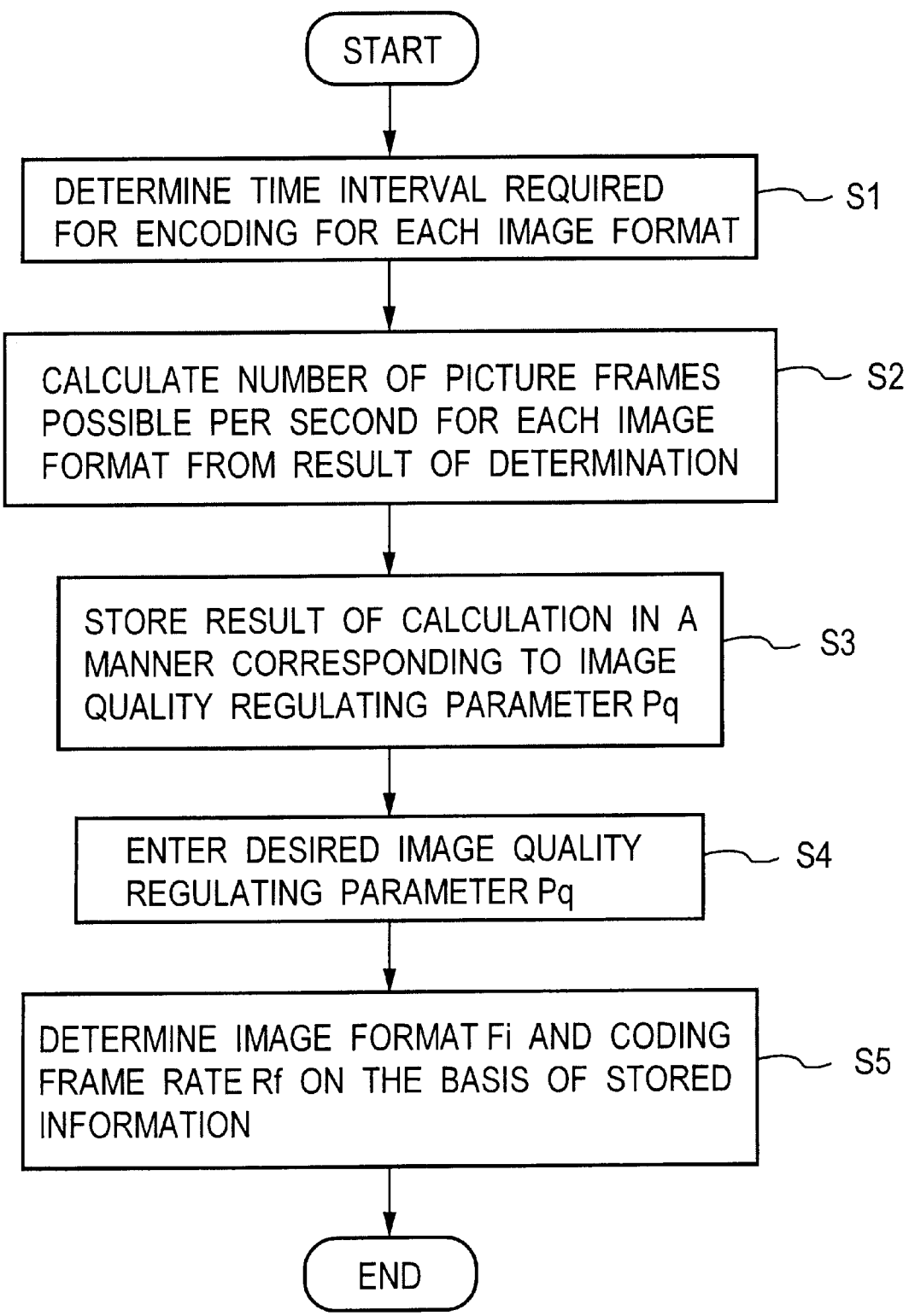
FIG. 22 is a flow chart illustrating the operation of the encoder shown in FIG. 21.

FIG. 21 shows a fourth embodiment of the picture encoder according to the invention, and FIG. 22 is a flow chart illustrating the operation thereof. As shown in FIG. 21, the picture encoder 10 comprises a parameter input section 11, an image quality regulator 12, a picture input unit 15, a picture coding processor 14, and a storage 13, and also comprises an encoding time measurement unit 17 and a coding frame rate calculator 18. The image quality regulator 12 includes a picture regulation processing main unit 12M and a picture encoding parameter generator 12ab.

Referring to FIG. 21, a calibration command is fed from the picture regulation processing main unit 12M to the picture encoding parameter generator 12ab of the image quality regulator 12, and in response to the command, the picture encoding parameter generator 12ab supplies an image formats Fi for CIF, QCIF, SQCIF and a fixed coding bit rate Rb to the picture coding processor 14 for purpose of an encoding operation.

In response to a result of the encoding operation, the encoding time measurement unit 17 determines a time interval T required for picture encoding for each image format (step S1). In response to a result of such determination, the coding frame rate calculator 18 calculates how many frames can be produced per second, or coding frame rate Rf=1/T for each image format (step S2). A result of such calculation is stored in the storage 13 in a manner corresponding to the image quality regulating parameter for the picture (step S3). The calculated coding frame rate represents a maximum frame rate which is possible for the given coding parameters (Fn, Rb). The picture encoding parameter generator 12ab regulates the encoding parameters for the picture on the basis of a desired image quality regulating parameter which is entered into the picture regulation processing main unit 12M by an operator at step S4 and the coding frame rate Rf which is stored in the storage 13 in a corresponding manner. For example, when the picture quality is motion oriented to the maximum extent, a maximum value of the coding frame rate which can be achieved by the picture encoding software and the picture communication equipment 100 as well as the image format are determined (step S5), which are supplied to the picture coding processor 14 to perform the encoding operation.

Figure 23:
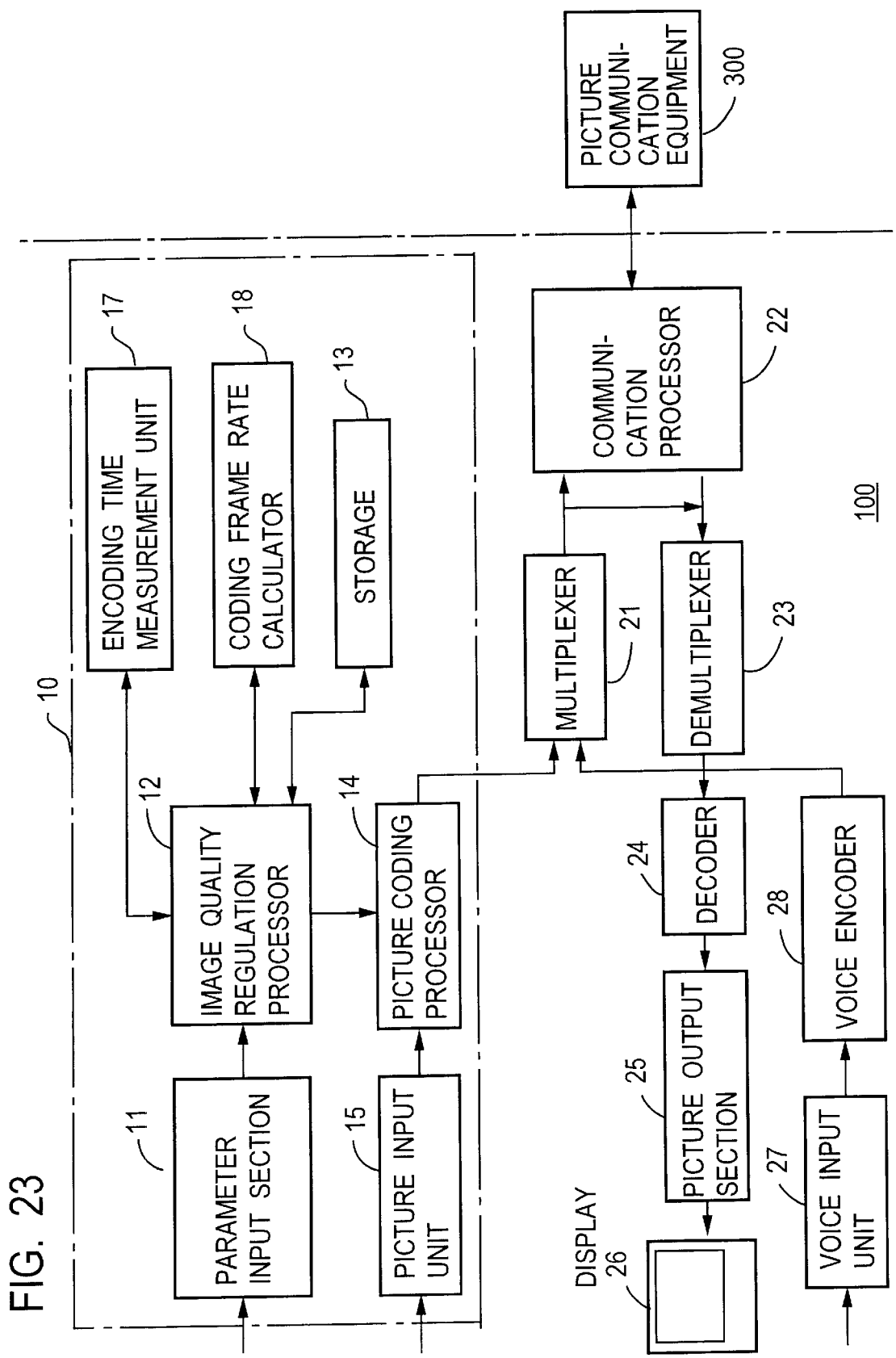
FIG. 23 is a block diagram of a picture communication equipment incorporating the picture encoder shown in FIG. 21.

FIG. 23 is a block diagram of a picture communication equipment 100 similar to the embodiment shown in FIG. 20, but incorporating the picture encoder 10 shown in FIG. 21. It is to be noted that in the example shown, a voice input section 27 and a voice encoder 28 are provided to encode an input voice so that it may be multiplexed with encoded picture data in a multiplexer 21 to be delivered through a communication processor 22. During the calibration, a parameter input section 11 and a communication processor 22 do not operate, and an output from a multiplexer 21 is fed to the input of a demultiplexer 23. A set of a coding bit rate Rb which is specified by an image quality regulator 12 and each image format Fi is supplied to a picture coding processor 14 to encode an input picture over a given number of frames, and the encoding time measurement unit 17 determines the time interval required for the encoding operation. The encoding time measurement unit 17 determines a time interval required to repeat a processing sequence (programmed sequence) a given number of iterations, the sequence including the reception of image data for one frame by a picture input unit 15, an encoding processing for the image data by the picture coding processor 14, a decoding processing of the encoded picture data by the decoder 24 and a display of the decoded picture data by the picture output unit 25(thus the picture for a given number of frames is displayed in a sequential manner). An encoding frame rate calculator 18 determines a time interval T required for the encoding of a single frame on the basis of a result of such determination, and determines its reciprocal 1/T as a frame rate.

FIG. 24 shows an example of a correspondence between the image quality regulating parameter and coding parameters stored in the storage 13. Because the processing capability varies depending on a picture communication equipment inclusive of a picture encoder, the calibration mentioned above is performed prior to initiating a communication, thus determining how many frames can be encoded in one second for each of CIF, QCIF and SQCIF. For example, an encoding operation over five frames may take place for CIF, and if a time interval required for the encoding operation is equal to 1250 ms, it follows that a mean encoding time interval for one frame is equal to 250 ms. Accordingly, the number of frames which can be encoded in one second is equal to four frames, that is, the maximum coding frame rate is 4 frames/sec. Let it be supposed that the maximum frame rates for CIF, QCIF and SQCIF are 4, 10 and 13, respectively. Then, a difference from a minimum frame rate, 1/sec, for CIF to a maximum frame rage, 13/sec, for SQCIF is evenly divided by the number of steps (7−1) of the image quality regulating parameter, thus deriving step size of a frame rate. The calculation applied in this instance is (13−1)/(7−1)=2, meaning that the number of frames proceeds by an increment of 2, beginning with a minimum number of frames of 1. Accordingly, the frame rates of 1 and 3 are selectable for CIF. The following frame rate would be 5, but because a maximum number of frames for CIF is equal to 4, QCIF format is selected. In this manner, the frame rates of 5, 7 and 9 are selectable for QCIF. However, because a maximum number of frames for QCIF is equal to ten, when the frame rate proceeds to 11, the SQCIF format is selected, and the frame rates of 11 and 13 are used for SQCIF.

To insure an appropriate use of the processing capability of the picture encoding software, and thus to realize an appropriate allotment of the processing capability of a picture encoder 10 itself as well as the processing capability of a picture capture device/voice device 15 or voice devices 27, 28 so that interruptions of a voice cannot occur, a picture encoding simulation software is used under the condition of non-real time processing which is free from the influence of the processing capability of the picture communication equipment or the like to conduct an image quality evaluation, with results given below.

(1) As a result of the image quality evaluation at the same coding frame rate and the same coding bit rate, CIF proved to be highest in the evaluation. Accordingly, if CIF is usable in respect of the processing capability of an encoder at a given coding frame rate, a use is made of CIF. If CIF is not usable, a use is made of QCIF. If QCIF is not useable, a use is made of SQCIF. If SQCIF is not usable, such frame rate is excluded from the use.

(2) Because the number of steps in the encoding processing operation remains always the same, the time interval required for the picture encoding is constant without any dependency upon the coding frame rate and the coding bit rate, but depends on the number of bits per frame for each of the image formats CIF, QCIF and SQCIF. Accordingly, the time interval required for the encoding decreases in the sequence of CIF, QCIF and SQCIF. Hence, if the multiplexer of the picture communication equipment (see FIG. 19) does not include a restriction by the bit rate, a time interval required for the encoding which is determined by using a set of suitable coding frame rate Rf and coding bit rate Rb is applicable to any coding frame rate and coding bit rate.

Despite the above evaluation results, the processing capability of a picture communication equipment is actually limited, and accordingly, to provide an implementation in consideration of this, a calibration of the processing capability is performed to determine a maximum coding frame rate which can be processed for each image format under a condition which is as close to an actual condition of use as possible. A chance to effect the calibration may be when the picture encoder is used for the first time, when there is a change from the presence to the absence or vice versa of an image (being received or transmitted), when a capture device is changed, when there is a change from the presence to the absence or vice versa of a voice (being received or transmitted), when a setting in a method of voice encoding is changed, or when a command is received from a user to transfer to a manual operation.

The calibration takes place by conducting a picture encoding operation while a video capturer (picture input unit 15), the display 26, the voice input section 27 and the voice encoder 28 are operative in a predetermined manner. The multiplexer 21 is assumed to provide a transmission bit rate of infinity, and an output from the multiplexer 21 shown in FIG. 22 is applied to the input of the demultiplexer 23, thus causing it to be decoded as an image from a peer entity in a local loop-back to be displayed on the display 26 or discarded as it is read. By utilizing the evaluation results that the time interval required for the picture encoding remains constant without any dependance upon the coding frame rate and the coding bit rate, a system portion from the video capturer to its picture encoding is operated at a coding bit rate of 32 kbps and a coding frame rate of 3 fps, for example, for each image format. A captor and encoding are repeated over five consecutive frames, for example, sequentially for each image format, and a mean value of the time interval T (seconds) required for the frames from the second to the sixth frame is determined. Its reciprocal 1/T obtained for each image format is chosen as an upper limit of the coding frame rate for each image format.

Figure 25:
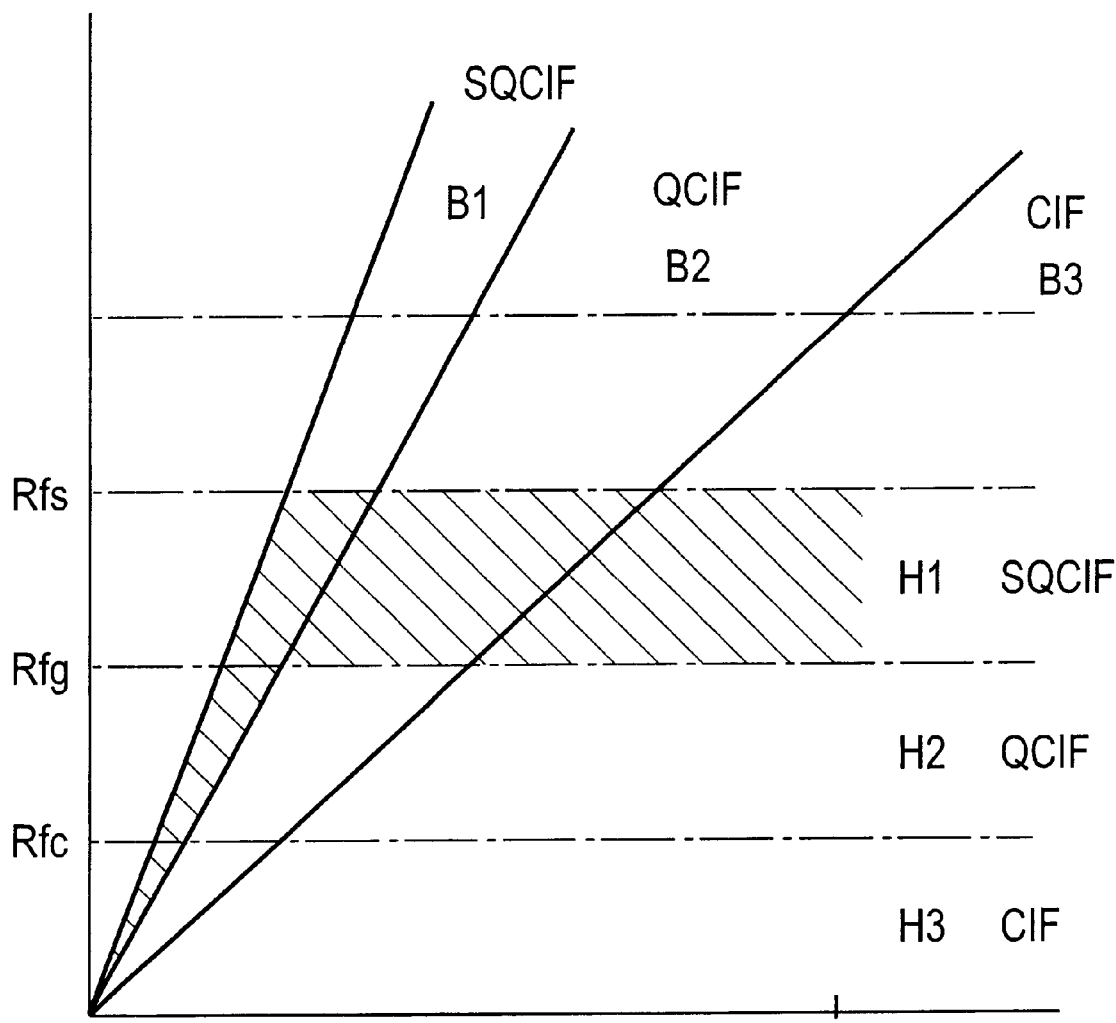
FIG. 25 is a diagram illustrating the upper limit of the coding frame rate determined for each image format by the calibration together with the regions shown in FIG. 9.

As a result of the above calibration, upper limits Rfc, Rfq and Rfs of the coding frame rate are determined for the image formats CIF, QCIF and SQCIF, respectively, and are shown in FIG. 25 together with the applicable regions shown in FIG. 9 in connection with the description of the first embodiment. An oblique band-shaped region as illustrated in connection with the first embodiment is only applied for a relatively low coding bit rate, and for any higher coding bit rate, the optimum region of the image format is represented by one of the three horizontal band-shaped regions H3, H2 and H1, which are sequentially selected for CIF, QXIF and SQCIF as the coding bit rate increases, independently from the magnitude of the coding bit rate. Accordingly, when such results are utilized in actuality, a combination of the oblique band-shaped region and the horizontal band-shaped region may be used. As an example, a region which is suitable for the image format SQCIF is shown hatched in FIG. 25. A similar combination may be used for the image formats QCIF and CIF.

Figure 26:
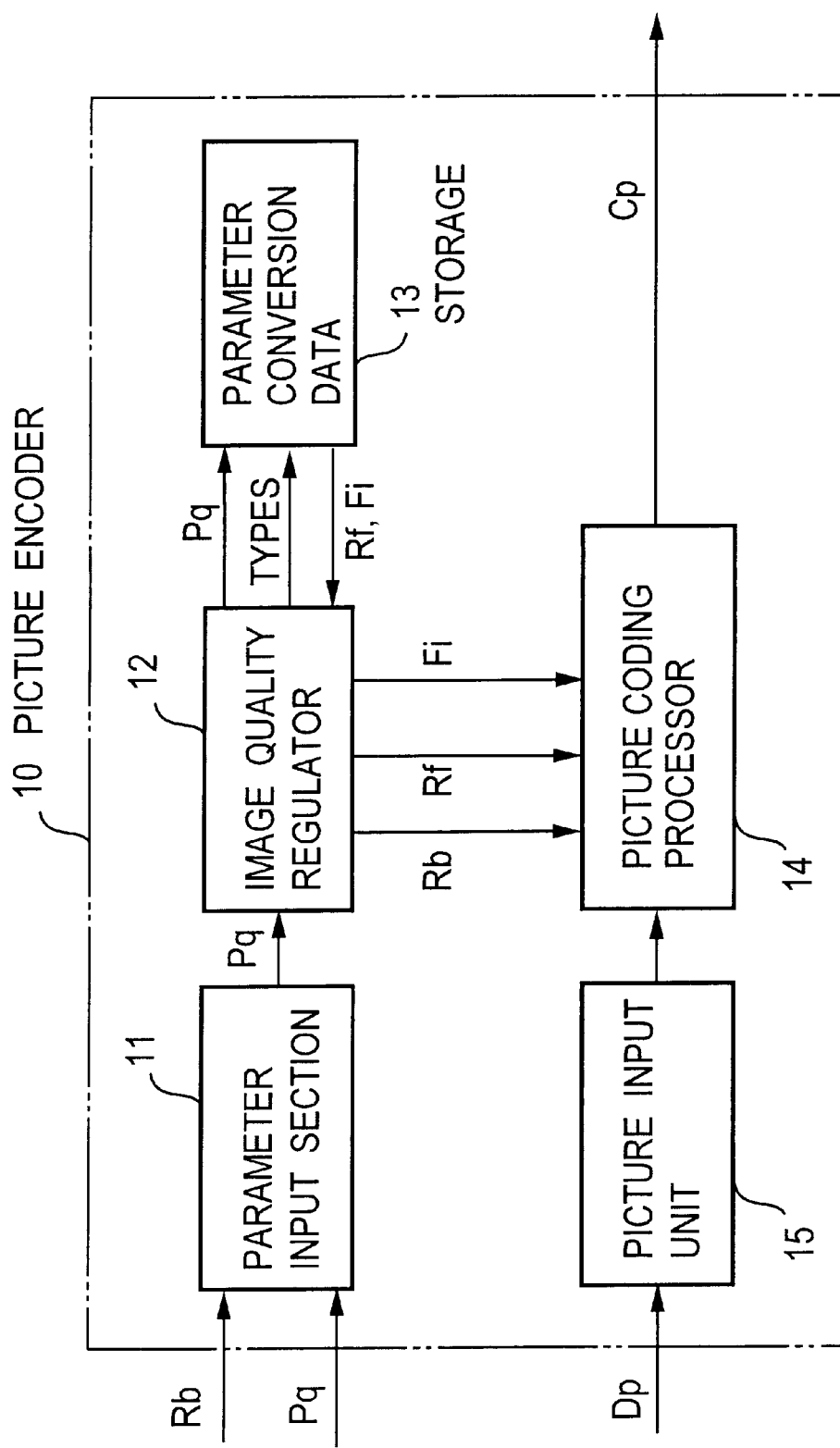
FIG. 26 is a schematic diagram of a sixth embodiment of the picture encoder according to the invention.
Figure 27:
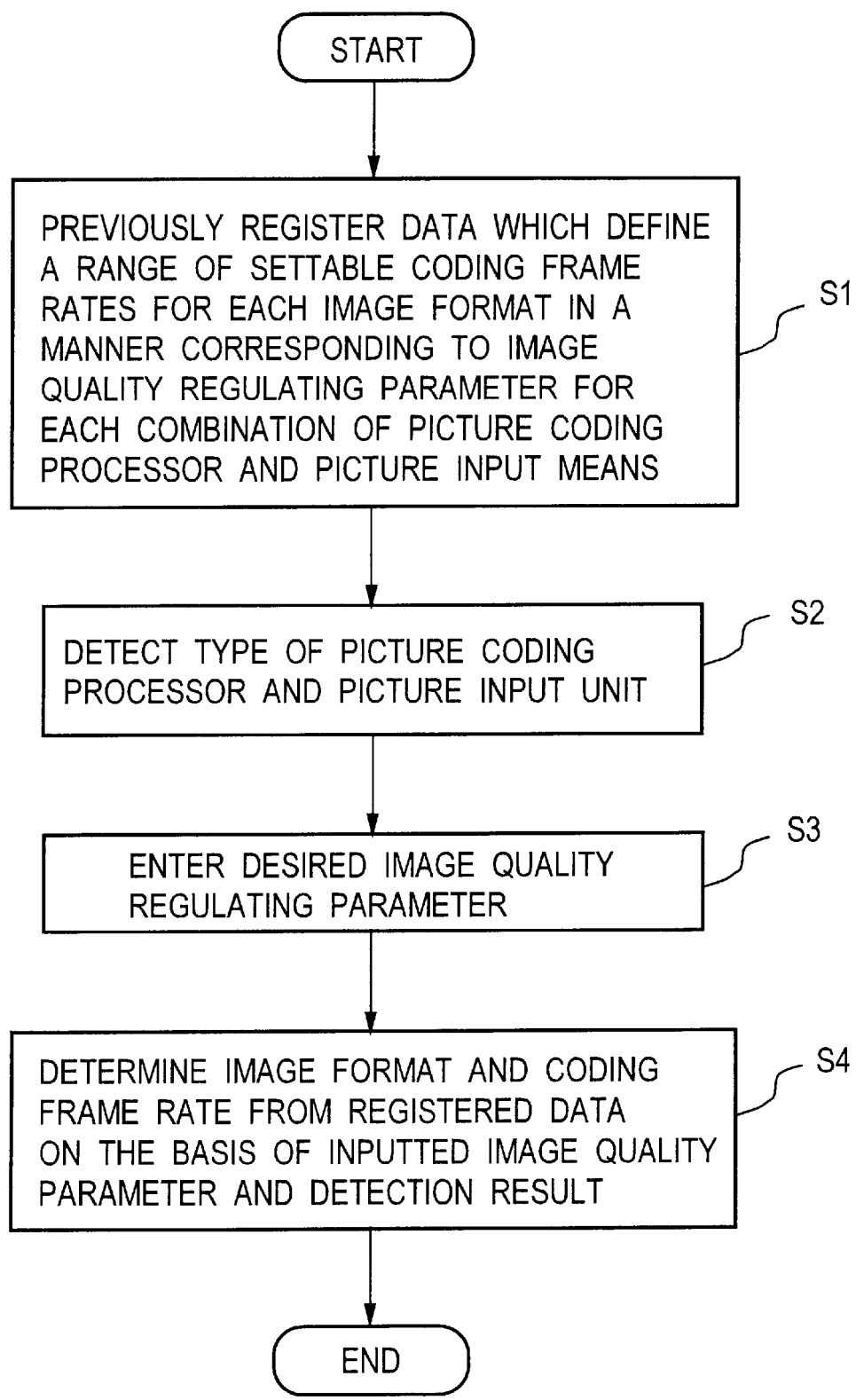
FIG. 27 is a flow chart of a second embodiment of a picture communication method according to the invention.

FIG. 26 shows a sixth embodiment of the picture encoder according to the invention, and FIG. 27 is a flow chart illustrating the operation thereof.

FIG. 26 illustrates the arrangement of a picture encoder 10 which is provided with means which defines a number of picture encoding frames which can be chosen for each image format in response to the inputted type of a calculator which performs the picture encoding operation.

Before operating the picture encoder 10, it is essential that a user inputs the type of a calculator in the picture encoder 10 (which may be CPU of a computer, not shown, for example, constituting a picture encoder) to the picture regulation processing main unit 12M. In addition, the type of the picture input unit 15 is inputted to the picture regulation processing main unit 12M (step S2). The picture regulation processing main unit 12M delivers the type of the calculator and the type of the picture input unit 26 which are inputted to the storage 13. The storage 13 is previously loaded with a table which defines an image quality regulating parameter for the picture depending on the type of the calculator and the type of the picture input unit 15 as shown in FIG. 28 (step S1), and the picture coding parameters (image format and the coding frame rate) which are to be referred to subsequently are read out accordance with the type of the processor and the type of the picture input unit which are input from the image quality regulator 12 (step S4).

When beginning the picture encoding operation, a user inputs to the image quality regulator 12 a desired image quality regulating parameter Pq to specify to what degree picture quality should be motion oriented or image resolution oriented. The image quality regulator 12 reads out from the storage 13 coding parameters Rf, Fi on the basis of the image quality regulating parameter Pq and the types of the processor and the picture imput unit, and supplies the coding parameters to the picture coding processor 14. In this manner, a picture which is input from the picture input unit 15 is encoded by the picture coding processor 14 with a desired image quality and is delivered.

To simplify the description, it is assumed in the above description that the type of the processor, and the type of the picture input unit 15 are initially input to the image quality regulator 12, and then the image quality regulating parameter Pq is subsequently input thereto. However, all of them may be simultaneously input to the image quality regulator 12. The type of the processor and the type of the picture input unit 15 may be input anytime before initiating the operation of the picture coding processor 14. For example, it should be understood that these types may be input only once at the time when the picture encoding software is installed into the picture communication equipment 100, and these types may be subsequently maintained in the image quality regulator 12 or the storage 13 to save the labor of a user while enabling a similar processing operation. A labor of the user can be saved while enabling a similar processing operation in the similar manner by a procedure other than inputting the types of the processor and the picture input unit by a user, for example, by determining, in the image quality regulator 12, the type of the processor of the picture communication equipment and the picture input unit as by reference to an environmental set-up information in a general purpose personal computer, for example.

FIG. 28 is a chart showing an example of a correspondence between image quality regulating parameter and coding parameters Rf, Fi for each pair of processor type and picture input unit type stored in the storage 13. In this Figure, only the types of a video capture board/card and a parallel port camera are listed as the picture input unit 15 to show their relationship with other parameter values in order to simplify the chart. This is because when operating the parallel port camera, the quantity of operations performed by a calculator is increased, requiring a particular distinction over other input means. However, it should be understood that the present invention is not limited to the use of such two types, but may be used to extract three types including a video capture board, a video capture card (PCMCIA card) and a parallel port camera, for example. In addition, by specifying the model number of the picture input unit in a more finely classified manner, a regulation of encoding parameters in a more exact manner is enabled. In the column "type of calculator", the processing capabilities are related such that "type A">"type B">. . . .

Figure 29:
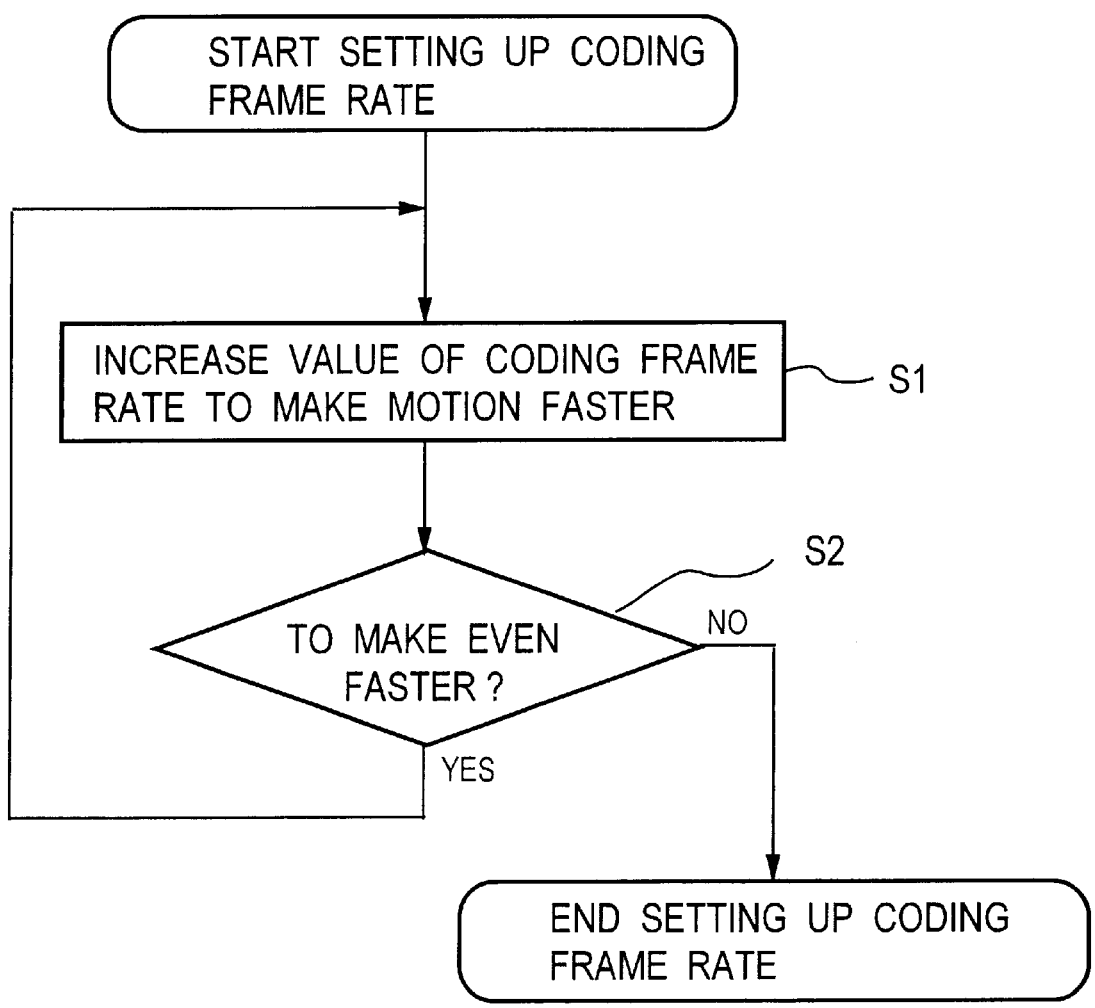
FIG. 29 is a flow chart illustrating a procedure of operations in the user interface according to the invention.

As a consequence of making a correspondence in this manner, when the coding frame rate is increased at step S1 in FIG. 29 by performing the parameter regulation, such a coding frame rate is automatically determined that is obtainable by exercising the processing capabilities of the picture encoding software and the picture communication equipment which prevails under the circumstance to the full extent. Accordingly, it is unnecessary for the user to determine whether or not a picture motion has reached the upper limit under the circumstance. Thus, in the decision at step S2, if the motion is to be brought to the maximum speed, it would suffice to set the image quality regulating parameter at step S1 to the maximum speed.

It should be understood that the functions of the arrangements shown in FIGS. 21 and 26 may be partially or entirely implemented with a computer or that the processing procedures as shown in FIGS. 22 and 27 can be executed by a computer. A program which implements the functions in a computer or a program which is used in a computer to execute the processing procedures may be recorded on a recording medium readable by a computer such as FD (floppy disc), MO, ROM, a memory card, CD, DVD, a removable disc or the like and offered for distribution.

With the fourth and the fifth embodiment mentioned above, a time interval required for the picture encoding operation is determined for each image format to derive data which defines a range of frame rates and an image format in a manner corresponding to the image quality regulating parameter. Alternatively, data may be registered which define an image format and a range of frame rates for each combination of coding processor and picture input unit in a manner corresponding to image quality regulating parameter. By so doing, optimum coding parameters can be determined for the image format and the coding frame rate without being influenced by the type of a picture communication equipment when a video-phone or a video-conference takes place or when a picture is accumulated through a communication network using a picture communication equipment to which a picture input/output device such as a camera or an audio input/output unit such as a loudspeaker is connected. This enables the encoding processing means such as a picture encoding software to operate to its full extent without causing interruptions of a voice.

EFFECT OF THE INVENTION

As discussed above, in accordance with the invention, a regulation of the image quality of a picture which occurs through the selection of an image format and a coding frame rate in a user interface of a picture communication equipment which effects a communication and a storage of picture information is achieved through an operation of a single parameter, whereby a regulation of a total image quality for the picture in a manner depending on whether the image quality or the motion is to predominate can be rapidly and exactly achieved.

In addition, with the fourth and the five embodiment, when a video-phone or a video-conference or a video-storing takes place through a communication network using a picture communication equipment to which a picture input/output device such as a camera and an audio input/output unit such as a loudspeaker are connected, it is possible to operate the picture encoding software to its full extent in conformity to the processing capabilities of different picture communication equipments to establish optimum coding parameters such as the image format and the coding frame rate, without causing interruptions of a voice.

What is claimed is:

1. A method of regulating an image quality of a picture in which an image quality regulating parameter is input to allow a regulation of encoding parameters which are used when encoding a picture, comprising the steps of:
    (a) previously storing characteristic information which defines an applicable range of coding bit rates together with an applicable range of coding frame rates for each image format;
    (b) entering one of the pluralities of coding bit rates together with an acquired image quality specifying parameter;
    (c-1) determining a range of possible coding frame rates in accordance with the coding bit rate;
    (c-2) determining a coding frame rate from the value of the parameter in accordance with the range of possible frame rates; and
    (c-3) determining an image format by reference to the characteristic information using the coding bit rate and the determined coding frame rate as keys.

2. A method of regulating an image quality of a picture in which an image quality regulating parameter is input to allow a regulation of encoding parameters which are used when encoding a picture, comprising the steps of:
    (a) previously storing characteristic information which defines an applicable range of coding frame rates for each image format in response to at least one predetermined coding bit rate;
    (b) acquiring an image quality specifying parameter; and
    (c) determining the image format and the coding frame rate by reference to the characteristic information using the parameter as a key;
        wherein the image formats comprise a first format of a predetermined first image size, a second format of a predetermined second image size which is less than the first image size and a third format of a predetermined third image size which is less than the second image size, and in which the applicable range of coding frame rates comprise a predetermined first region, a predetermined second region adjacent to and higher than the first region, and a predetermined third region adjacent to and higher than the second region for the first, the second and the third format.

3. A method of regulating an image quality according to one of claim 1 or 2 in which the step (b) comprises the step of receiving the image quality specifying parameter through a communication network.

4. A method of regulating an image quality of a picture in which an image quality regulating parameter is input to allow a regulation of encoding parameters which are used when encoding a picture, comprising the steps of:
    (a) previously storing characteristic information which defines an applicable range of coding frame rates for each image format in response to at least one predetermined coding bit rate;
    (b) acquiring an image quality specifying parameter;
    (c) determining the image format and the coding frame rate on the basis of a result of the calculation and the image quality regulating parameter which is input;
    (o-1) previously measuring a time interval required for encoding for each image format;
    (o-2) and calculating a possible coding frame rate for each image format using a result of the determination;
        wherein the image formats comprise a first format of a predetermined first image size, a second format of a predetermined second image size which is less than the first image size, and a third format of a predetermined third image size which is less than the second image size, the step (o-1) further comprising the step of encoding each of the first, the second and the third format with preselected coding bit rate and coding frame rate and of determining a time interval required for the encoding, and the step (o-2) further defining a first, a second and a third encoding frame rate which are determined from the time interval required for the encoding of each of the first, the second and the third format as the upper limit of the coding frame rate for each of the first, the second and the third format, thus defining a first region as extending from the lowest frame rate to the first coding frame rate, a second region as extending from the first coding frame rate to the second coding frame rate and a third region as extending from the second coding frame rate to the third coding frame rate, which regions are determined to be the applicable range optimal to each of the first, the second and the third format.

5. A method of regulating an image quality of a picture in which an image quality regulating parameter is input to allow a regulation of encoding parameters which are used when encoding a picture, comprising the steps of:
    (o-1) previously measuring a time interval required for encoding for each image format;
    (o-2) calculating a possible coding frame rate for each image format using a result of the determination;
        (a) storing data which defines a range of possible coding frame rates for each image format in response to the resulting image quality regulating parameter;
        (b) acquiring an image quality specifying parameter;
        (c) determining the image format and the coding frame rate by reference to said data in response to the input of the image quality regulating parameter;
            (1) monitoring a device which carries out a picture encoding operation to detect any registration or alteration of picture input means to the device or any registration or alteration of a software other than, but operating concurrently with, a program which execute the picture encoding; and
            (2) executing the steps (o-1) and (o-2) in response to one of a result of the detection, an execution command from a user and a loading of a different program on the device.

6. A method of regulating an image quality of a picture in which an image quality regulating parameter is input to allow a regulation of encoding parameters which are used when encoding a picture, comprising the steps of:
    (a) previously registering data which defines a range of possible coding frame rates for each image format and for a combination of the type of a picture encoding calculator and picture input means in a manner corresponding to the image quality regulating parameter;
    (b) detecting the type of the picture encoding calculator and the picture input means in the device which executes the method of regulating the image quality; and (c) determining the image format and the coding frame rate by reference to the registered data on the basis of the image quality regulating parameter which is input and a result of the detection.

7. A recording medium having a program recorded thereon which is used to execute in a computer a method of regulating an image quality of a picture in which an image quality regulating parameter is input to allow a regulation of encoding parameters which are used when encoding a picture, the program comprising the steps of:

(a) previously storing characteristic information which defines an applicable range of coding frame rates and an applicable range of coding bit rates for each image format;

(b) entering one of the plurality of coding bit rates together with the image quality specifying parameter;

(c-1) determining a range of possible coding frame rates in accordance with the coding bit rate;

(c-2) determining the coding frame rate from the value of the parameter within the range of possible coding frame rates; and (c-3) determining the image format by reference to the characteristic information using the coding bit rate and the determined coding frame rate as keys.

8. A recording medium having a program recorded thereon which is used to execute in a computer a method of regulating an image quality of a picture in which an image quality regulating parameter is input to allow a regulation of encoding parameters which are used when encoding a picture, the program comprising the steps of:

(a) previously storing characteristic information which defines an applicable range of coding frame rates for each image format in response to at least one predetermined coding bit rate;

(b) entering an image quality specifying parameter;

(c) and determining the image format and the coding frame rate by reference to the characteristic information using the parameter as a key;

wherein the image formats comprise a first format of a predetermined first image size, a second format of a predetermined second image size which is less than the first image size, and a third format of a predetermined third image size which is less than the second image size and in which the applicable range of coding frame rates comprises a predetermined first region, a predetermined second region adjacent to and higher than the first region and a predetermined third region adjacent to and higher than the second region, which regions are determined for the first, the second and the third format, respectively.

9. A recording medium according to one of claims 7 or 8 in which the step (b) further comprises the step of receiving the image quality specifying parameter through a communication network.

10. A recording medium having a program recorded thereon which is used to execute in a computer a method of regulating an image quality of a picture in which an image quality regulating parameter is input to allow a regulation of encoding parameters which are used when encoding a picture, the program comprising the steps of:

(o-1) previously determining a time interval required for encoding for each image format;

(o-2) and calculating a possible coding frame rate for each image format using a result of the determination;

(a) previously storing characteristic information which defines an applicable range of coding frame rates for each image format in response to at least one predetermined coding bit rate;

(b) entering an image quality specifying parameter;

(c) determining the image format and the coding frame rate on the basis of a result of the calculation and the image quality regulating parameter which is input; and wherein the image formats comprise a first format of a predetermined first image size, a second format of a predetermined second image size which is less than the first image size and a third format of a predetermined third image size which is less than the second image size, the step (o-1) further comprising the step of encoding each of the first, the second and the third format with preselected coding bit rate and coding frame rate and of determining a time interval required for the encoding, the step (o-2) further determining a first, a second and a third coding frame rate which are determined from the time interval required for encoding each of the first, the second and the third format as the upper limit of the coding frame rate for each of the first, the second and the third format, thus defining a first region as extending from the lowest frame rate to the first coding frame rate, a second region as extending from the second coding frame rate to the third coding frame rate and a third region as extending from the second coding frame rate to the third coding frame rate, which regions are determined to be the applicable range optimal to each of the first, the second and the third format.

11. A recording medium having a program recorded thereon which is used to execute in a computer a method of regulating an image quality of a picture in which an image quality regulating parameter is input to allow a regulation of encoding parameters which are used when encoding a picture, the program comprising the steps of:

(o-1) previously determining a time interval required for encoding for each image format;

(o-2) and calculating a possible coding frame rate for each image format using a result of the determination;

(a) storing data which defines a range of possible coding frame rates for each image format in a manner corresponding to the resulting image quality regulating parameter;

(b) entering an image quality specifying parameter;

(c) determining the image format and the coding frame rate on the basis of a result of the calculation and the image quality regulating parameter which is input;

(1) monitoring a device which executes a picture encoding operation to detect a registration or alteration of picture input means to the device or a registration or alteration of a software other than, but operating concurrently with, a program which executes the picture encoding;

(2) and executing the steps (o-1) and (o-2) in response to one of a result of the detection, an execution command from a user and a loading of a different program on the device.

12. A recording medium having a program recorded thereon which is used to execute in a computer a method of regulating an image quality of a picture in which an image quality regulating parameter is input to allow a regulation of encoding parameters which are used when encoding a picture, the program comprising the steps of:

(a) previously registering data which defines a range of possible coding frame rates for each image format in response to a combination of the type of a picture encoding calculator and picture input means in a manner corresponding to the image quality regulating parameter;

(a-1) detecting the type of a picture encoding calculator and picture input means in the device which executes the image quality regulating method;

(b) entering an image quality specifying parameter;

(c) determining the image format and the coding frame rate by reference to the registered data on the basis of the image quality regulating parameter which is input and a result of the detection.

13. A picture communication equipment including a picture/encoder capable of regulating an image quality of a picture in which an image quality regulating parameter is input to allow a regulation of encoding parameters which are used in encoding a picture, the picture encoder comprising:

a storage for storing characteristic information which defines an applicable range of coding frame rates for each image format in response to at least one predetermined coding bit rate;

an image quality regulator responsive to an input of at least image quality specifying parameter to determine the image format and the coding frame rate by reference to said characteristic information in the storage; and a picture coding processor for encoding a picture according to the determined image quality and coding frame rate to deliver encoded picture data to be transmitted;

wherein the image formats comprise a first format of a predetermined first image size, a second format of a predetermined second image size which is less than the first image size and a third format of a predetermined third image size which is less than the second image size and in which the applicable range of coding frame rates comprises a predetermined first region, a predetermined second region adjacent to and higher than the first region and a predetermined third region adjacent to and higher than the second region, which regions are determined for the first, the second and the third format, respectively.

14. A picture communication equipment including a picture/encoder capable of regulating an image quality of a picture in which an image quality regulating parameter is input to allow a regulation of encoding parameters which are used in encoding a picture, the picture encoder comprising:

a storage for storing characteristic information which defines an applicable range of coding frame rates for each image format in response to at least one predetermined coding bit rate;

an image quality regulator responsive to an input of at least image quality specifying parameter to determine the image format and the coding frame rate by reference to said characteristic information in the storage; and a picture coding processor for encoding a picture according to the determined image quality and coding frame rate to deliver encoded picture data to be transmitted wherein the storage stores characteristic information which defines applicable ranges of coding frame rates and coding bit rates for each image format in a manner corresponding to each of a plurality of predetermined coding bit rates, the image quality regulator including means responsive to a coding bit rate and an image quality specifying parameter to determine and deliver the image format and the coding frame rate by reference to the characteristic information in the storage.

15. A picture communication equipment according to claim 14 in which the image quality regulator comprises a coding frame rate decision unit for determining a range of possible coding frame rates in accordance with a value of the coding bit rate and for determining the coding frame rate from the parameter value within the range of possible coding frame rates; and an image format decision unit for determining the image format by reference to the characteristic information in the storage by using the coding bit rate and the determined coding frame rate as keys.

16. A picture communication equipment according to claims 14 or 15, further comprising communication means for receiving the image quality specifying parameter through a communication network.

17. A picture communication equipment according to claims 14 or 15, further comprising parameter entry means for entering the image quality specifying parameter.

18. A picture communication equipment according to claims 14 or 15, further comprising decoder means for decoding the encoded picture data produced by the picture coding processor to produce picture data, a picture output unit for producing image data to be displayed from the picture data, and a display having a screen on which the image data is displayed.

19. A picture communication equipment including a picture/encoder capable of regulating an image quality of a picture in which an image quality regulating parameter is input to allow a regulation of encoding parameters which are used in encoding a picture, the picture encoder comprising:

a storage for storing characteristic information which defines an applicable range of coding frame rates for each image format in response to at least one predetermined coding bit rate;

an image quality regulator responsive to an input of at least image quality specifying parameter to determine the image format and the coding frame rate by reference to said characteristic information in the storage; and a picture coding processor for encoding a picture according to the determined image quality and coding frame rate to deliver encoded picture data to be transmitted a determination unit for determining a processing time interval required for a picture encoding operation for each image format; and a coding frame rate calculator for calculating a possible coding frame rate for each image format using the processing time interval determined by the determination unit and for storing it in the storage as the characteristic information; the image quality regulator including means for determining the image format and the coding frame rate in response to the image quality regulating parameter which is input.

20. A picture communication equipment according to claim 19 in which the image formats comprise a first format of a predetermined first image size, a second format of a predetermined second image size which is less than the first image size and a third format of a predetermined third image size which is less than the second image size;

the determination unit including means for encoding each of the first, the second and the third format with preselected coding bit rate and coding frame rate and for determining a time interval required for the encoding; and the coding frame rate calculator including means for determining a first, a second and a third coding frame rate which are determined from the time interval required for the encoding of each of the first, the second and the third format as the upper limit of the coding frame rate for each of the first, the second and the third format, thus defining a first region as extending from the lowest frame rate to the first encoding frame rate, a second region as extending from the first coding frame rate to the second coding frame rate and a third region as extending from the second coding frame rate to the third coding frame rate, which regions are determined to be the applicable range optimal to each of the first, the second and the third format.

21. A picture communication equipment including a picture/encoder capable of regulating an image quality of a picture in which an image quality regulating parameter is input to allow a regulation of encoding parameters which are used in encoding a picture, the picture encoder comprising:

a storage for storing characteristic information which defines an applicable range of coding frame rates for each image format in response to at least one predetermined coding bit rate;

an image quality regulator responsive to an input of at least image quality specifying parameter to determine the image format and the coding frame rate by reference to said characteristic information in the storage; and a picture coding processor for encoding a picture according to the determined image quality and coding frame rate to deliver encoded picture data to be transmitted;

wherein the storage previously stores data as the characteristic information which defines a range of possible coding frame rates for each format and for a combination of the type of a picture encoding calculator and picture input means in a manner corresponding to the image quality regulating parameter; and the image quality regulator comprising means for detecting the type of the picture encoding calculator and picture input means from an environmental set-up information of the apparatus and for determining the image format and the coding frame rate by reference to the stored data on the basis of the image quality regulating parameter which is input and a result of the detection.

* * * * *